US008576833B2

(12) United States Patent
Qiu et al.

(10) Patent No.: US 8,576,833 B2
(45) Date of Patent: Nov. 5, 2013

(54) FAULT TOLERANT VOICE OVER INTERNET PROTOCOL (VOIP) SYSTEMS AND METHODS TO OPERATE THE SAME

(75) Inventors: Chaoxin Charles Qiu, Austin, TX (US); William R. J. Chorley, Spicewood, TX (US); Richard L. Khan, San Ramon, CA (US); Satish Parolkar, Austin, TX (US); Robert F. Dailey, Austin, TX (US); James Jackson, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1807 days.

(21) Appl. No.: 11/611,557

(22) Filed: Dec. 15, 2006

(65) Prior Publication Data

US 2008/0144605 A1    Jun. 19, 2008

(51) Int. Cl.
*H04L 12/66*     (2006.01)
*H04L 12/28*     (2006.01)
*H04W 4/00*     (2009.01)

(52) U.S. Cl.
USPC ......... 370/352; 370/392; 370/401; 455/435.1

(58) Field of Classification Search
USPC ............. 370/352–356, 392, 401; 455/435.1
See application file for complete search history.

(56) References Cited

U.S. PATENT DOCUMENTS

| | | | |
|---|---|---|---|
| 6,938,182 B2 | 8/2005 | Shaffer et al. | |
| 7,023,794 B2 | 4/2006 | Khan et al. | |
| 7,747,672 B1* | 6/2010 | Marwah | 709/200 |
| 2003/0167343 A1 | 9/2003 | Furuno | |
| 2004/0153667 A1* | 8/2004 | Kastelewicz et al. | 713/201 |
| 2005/0050171 A1 | 3/2005 | Deerman et al. | |
| 2005/0071455 A1* | 3/2005 | Collins | 709/223 |
| 2005/0281204 A1 | 12/2005 | Karol et al. | |
| 2006/0075126 A1 | 4/2006 | Lehrschall et al. | |
| 2006/0164975 A1 | 7/2006 | Filsfils et al. | |
| 2007/0183364 A1* | 8/2007 | Donovan et al. | 370/331 |
| 2008/0056234 A1* | 3/2008 | Sprague | 370/352 |
| 2010/0061316 A1* | 3/2010 | Levenshteyn et al. | 370/329 |

FOREIGN PATENT DOCUMENTS

WO    WO 2008/000291    *    3/2008

OTHER PUBLICATIONS

Karol, M.; Krishnan, P.; Li, J.J., "Rapid Fault Detection and Recovery for IP Telephony", 2004 IEEE International Conference on Communications, vol. 3, Jun. 20-24, 2004, pp. 1484-1489.

Tamasi, L.; Orincsay, D.; Balazs Gabor Jozsa; Gabor Magyar, "Design of Survivable VPN Based Voip Networks", Proceedings, 5th International Workshop on Design of Reliable Communication Networks, 2005, (DRCN 2005), Oct. 16-19, 2005.

DNS SRV—voip-info.org, downloaded from http://www.voip-info.org/wiki-DNS+SRV on Oct. 12, 2006, 6 pages.

* cited by examiner

*Primary Examiner* — Asad Nawaz
*Assistant Examiner* — Joel Hamel
(74) *Attorney, Agent, or Firm* — Hanley, Flight & Zimmerman, LLC

(57) ABSTRACT

Fault tolerant VoIP systems and methods to operate the same are disclosed. An example method comprises receiving a registration request at an edge device of a voice over Internet protocol (VoIP) system from a user device, selecting at the edge device a communication service providing device from a list of devices configured to provide communication services, sending the registration request to the selected communication service providing device, and receiving a registration response from the selected communication service providing device.

29 Claims, 15 Drawing Sheets

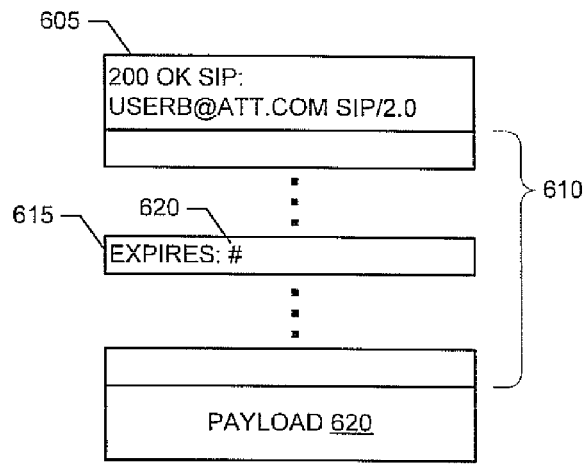

FIG. 6

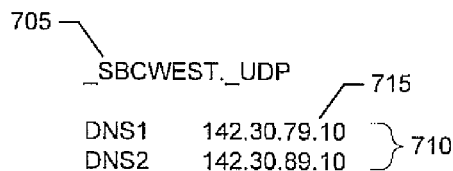

FIG. 7

```
      ; SRV RECORDS FOR SUBSCRIBERS DESIGNATED TO OFFICE #1
      ; ASSIGN HIGHER PRIORITY 0 AND LARGER WEIGHT 3 TO
805 ⎰ ; IPBE IN REGION #1     ┌─ 825                        ┌─ 822
    ⎱ _SBCWEST._UDP    SRV 0   3    5060    IMS-CORE1.ATT.COM ⎫
         810 ─╱         SRV 1   0    5060    IMS-CORE2.ATT.COM ⎬ 820
                               ╲─ 830
      ; SRV RECORDS FOR SUBSCRIBERS DESIGNATED TO OFFICE #2
      ; ASSIGN HIGHER PRIORITY 0 AND LARGER WEIGHT 3 TO
      ; IPBE IN REGION #2
        _SBCEAST._UDP   SRV 0   3    5060    IMS-CORE2.ATT.COM
         815 ─╱         SRV 1   0    5060    IMS-CORE1.ATT.COM

835 ⎰ IMS-CORE1    A    142.30.79.10
    ⎱ IMS-CORE2    A    142.30.89.10
      822 ─╱            840 ─╱
```

FIG. 8

| P-CSCF GROUP NAME | P-CSCF GROUP PRIORITY | LOAD DISTRIBUTION STRATEGY |
|---|---|---|
| PCSCF-PHILLY | 1 | ROUND-ROBIN |
| PCSCF-DALLAS | 2 | RANDOM |

905 / 910 / 915 / 917

| P-CSCF GROUP NAME | P-CSCF MEMBER | STATUS |
|---|---|---|
| PCSCF-PHILLY | PCSCF1.att.com | |
| PCSCF-PHILLY | PCSCF2.att.com | |
| PCSCF-PHILLY | PCSCF3.att.com | |
| PCSCF-PHILLY | PCSCF4.att.com | |
| PCSCF-PHILLY | PCSCF5.att.com | |

920 / 925 / 926 / 927 / 928

| P-CSCF GROUP NAME | NUMBER OF TRANSACTION TIMEOUTS TO MARK P-CSCF OOS | TIME TO RESUME ACCESS ATTEMPTS P-CSCF in OOS | T1 TIMER | SIP REQUEST RETRY NUMBER |
|---|---|---|---|---|
| PCSCF-PHILLY | 1 | 600 | 500 | 1 |
| PCSCF-DALLAS | 2 | 600 | 500 | 2 |

```
LOCAL-POLICY
    POLICY-ATTRIBUTE
        NEXT-HOP    SAG:PCSCF-PHILLY ─── 910
        COST        0
                     ─ 915
        ...
    POLICY-ATTRIBUTE
        NEXT-HOP    SAG:PCSCF-PHILLY ─── 910
        COST        10
                     ─ 915
        ...
    POLICY-ATTRIBUTE
        NEXT-HOP    SAG:PCSCF-DALLAS ─── 910
        COST        20
                     ─ 915
        ...
```
905 brackets the LOCAL-POLICY block.

```
SESSION AGENT GROUP (SAG)

SESSION-GROUP
    GROUP-NAME  PCSCF-PHILLY
                              ─ 917
    ...
    STRATEGY    ROUND-ROBIN
    DEST
            PCSCF1.ATT.COM
            PCSCF2.ATT.COM
            PCSCF3.ATT.COM   } 925
            PCSCF4.ATT.COM
            PCSCF5.ATT.COM
            ... ...
```
920 brackets the SESSION AGENT GROUP block.

```
SESSION-AGENT
    HOSTNAME        PCSCF1.ATT.COM
    ...                            ─ 940
    TRANS-TIMEOUTS  10
    TIME-TO-RESUME  600
    TTR-NO-RESPONSE 4   ─ 945
                         ─ 950
```
935 brackets the SESSION-AGENT block.

FIG. 9C

FAULT TOLERANT VOICE OVER INTERNET PROTOCOL (VOIP) SYSTEMS AND METHODS TO OPERATE THE SAME

FIELD OF THE DISCLOSURE

This disclosure relates generally to voice over Internet protocol (VoIP) systems and, more particularly, to fault tolerant VoIP systems and methods to operate the same.

BACKGROUND

In voice over Internet Protocol (VoIP) systems, such as Internet protocol (IP) Multimedia sub-system (IMS) based VoIP systems, a user device (e.g., a VoIP phone, a VoIP analog telephone adapter, etc.) needs to have a valid registration to access VoIP services. During each registration, the user device negotiates with a registrar for a registration expiration window (i.e., how long the user device can wait to re-register without loosing access to services). Subsequently, the user device re-registers based upon, for example, a timer that lapses before the registration expiration window closes. Today, if a failure causes, for example, the registrar to fail during this window, the user device may not be aware of the failure until the user device attempts to re-register and/or to access a VoIP service (e.g., to make a phone call, retrieve voicemail, etc.). Once the user device is aware of the loss of its registration, the user device must first re-register with a different registrar (i.e., a replacement registrar) before VoIP services can be resumed to the device. During such times, the VoIP device is also incapable of receiving incoming VoIP services (e.g., receiving a phone call), unbeknownst to the user of the user device.

BRIEF DESCRIPTION OF THE DRAWINGS

FIG. 6 illustrates an example data structure that may be used to implement a registration response message.

FIG. 7 illustrates an example data structure that may be used to configure and/or provision any or all or the example VoIP devices of FIG. 1.

FIG. 8 illustrates an example data structure that may be used to configure and/or provision any or all of the example DNS servers of FIG. 1.

FIGS. 9A, 9B and 9C illustrate example data structures that may be used to configure and/or provision any or all of the example edge devices of FIGS. 1 and 3.

DETAILED DESCRIPTION

Figure 1:
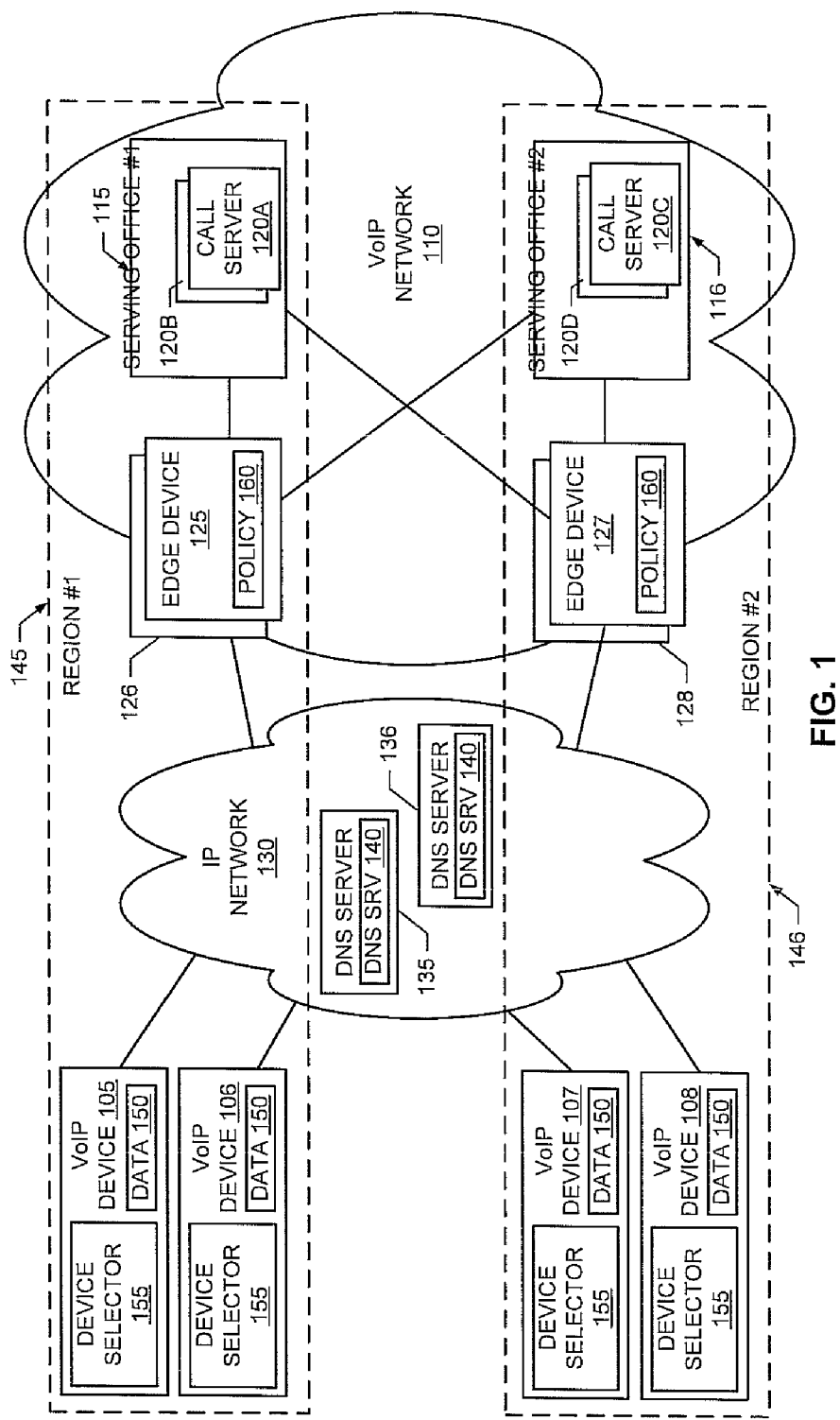
FIG. 1 is a schematic illustration of an example voice over Internet protocol (VoIP) communication system constructed in accordance with the teachings of the invention.

FIG. 1 is a schematic illustration of an example VoIP communication system constructed in accordance with the teachings of the invention. In the interest of brevity and clarity, throughout the following disclosure references will be made to the example fault tolerant VoIP communication system of FIG. 1 and/or methods to operate the same. However, it should be understood that the methods and apparatus to implement fault tolerant communication systems disclosed herein are applicable to other examples and/or types of VoIP communication systems, and/or other examples and/or types of communication services, networks, technologies and/or systems, such as public switched telephone network (PSTN) systems, public land mobile network (PLMN) systems, wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, power-line broadcast systems, fiber optic networks, and/or combinations and/or hybrids of these devices, systems and/or networks.

Further, while disclosed examples discussed herein utilize session initiation protocol (SIP) exchanges, messages and/or techniques to register devices, re-register devices, and/or initiate, establish and/or modify VoIP communication sessions, any number and/or type(s) of communication protocol(s), message(s), exchange(s) and/or technique(s) for initiating, establishing and/or modifying communication sessions may be utilized. For example, any past, current and/or future standards) and/or specification(s) such as the International Telecommunication Union (ITU) H.248 standard may be employed.

To allow users to access VoIP based communication services (e.g., a telephone call, voicemail, etc.), the example communication system of FIG. 1 includes one or more VoIP devices, four of which are illustrated in FIG. 1 with reference numerals 105, 106, 107 and 108. The example VoIP devices 105-108 of FIG. 1 may be any type(s) of VoIP devices including, for example, a VoIP phone, a VoIP residential gateway, a VoIP enabled personal computer (PC), a VoIP endpoint, a wireless VoIP device (e.g., a wireless-fidelity (WiFi) Internet protocol (IP) phone), or a VoIP adapter (e.g., an analog telephone adapter (ATA)).

To provide VoIP communication services, the example system of FIG. 1 includes one or more VoIP communication networks, one of which is illustrated with reference numeral 110 in FIG. 1. To initiate, receive, establish, complete and/or route any type(s) of VoIP communication sessions and/or VoIP services with, to and/or between the example VoIP devices 105-108, the example VoIP communication network 110 of FIG. 1 may communicate with and/or contain any portion of any number and/or type(s) of call serving offices, two of which are illustrated in FIG. 1 with reference numerals 115 and 116.

To process, and/or provide signaling and/or session control for VoIP communication sessions and/or VoIP services, each of the example call serving offices 115, 116 of FIG. 1 includes one or more call server modules, four of which are illustrated in FIG. 1 with reference numbers 120A, 120B, 120C, and 120D. Each of the example call server modules 120A-D of FIG. 1 include, possibly among other things, a proxy call session control function (CSCF) (P-CSCF) server, an interrogating CSCF (I-CSCF) server and a serving CSCF (S-CSCF) server. In the example VoIP network 110 of FIG. 1, the call server modules 120A-D are implemented at least in pairs to provide redundancy, with at least one of the pair (i.e., a backup 120B) assigned to serve as a backup for the other one of the pair (i.e., a primary 120A). Thus, if a primary call server module 120A fails, its backup call server module 120B can continue processing VoIP services and/or VoIP sessions for VoIP devices 105-108 registered to the primary call server module 120A. The number and/or type(s) of call server modules 120A-D implemented by and/or at a particular call serving office 115, 116 depends upon the number and/or type(s) of services and/or subscribers supported by the call serving office 115, 116. An example manner of implementing the example call serving offices 115, 116 and the example call server modules 120A-D are described below in connection with FIG. 2.

To communicatively couple the VoIP devices 105-108 to the VoIP network 110 and/or, more particularly, to the call serving offices 115, 116 and the call server modules 120A-D, the example VoIP network 110 of FIG. 1 includes any number of edge devices, four of which are illustrated in FIG. 1 with reference numerals 125, 126, 127 and 128. In the example VoIP network 110 of FIG. 1, the edge devices 125-128 are session border controllers and are implemented at, and/or together with, an associated call serving office 115, 1116. However, any type(s) of edge devices 125-128 may be used, and/or edge devices 125-128 may be implemented separately from call serving offices 115, 116.

In the example VoIP network 110 of FIG. 1, the edge devices 125-128 are implemented in at least pairs to provide redundancy, with at least one of the pair (e.g., the edge device 126) assigned to serve as a backup for the other one of the pair (e.g., the edge device 125). During operation, a primary edge device provides state information to its associated backup edge device such that the backup edge device can replace the primary edge device if and/or when the primary edge device were to be out of service due to, for example, a failure, and/or a loss of power. An example manner of implementing the example edge devices 125-128 of FIG. 1 is described below in connection with FIG. 3.

In the illustrated example of FIG. 1, the example VoIP devices 105-108 are communicatively coupled to the example edge devices 125-128 and/or the VoIP network 110 via any number and/or type(s) of public and/or private IP networks 130 such as the Internet. However, any number and/or type(s) of past, current and/or future communication network-(s), communication system(s), communication device(s), transmission path(s), protocol(s), technique(s), specification(s) and/or standard(s) could be used to couple the VoIP devices 105-108 to the edge devices 195-128 and/or, more generally, to couple the VoIP devices 105-108 to the VoIP network 110. Interfaces between the VoIP devices 105-108 and the IP network 130, and/or between the edge devices 125-128 and the IP network 130 may be implemented using any number and/or type(s) of past, current and/or future device(s), system(s), specification(s), standard(s), technology(-ies) and/or method(s). For instance, the example VoIP devices 105-108 may be coupled to the IP network 130 via any type(s) of voice-band modem(s), digital subscriber line (DSL) modem(s), cable modem(s), Ethernet transceiver(s), optical transceiver(s), IP virtual private network (VPN) connection(s), Institute of Electrical and Electronics Engineers (IEEE) 802.11x (a.k.a. WiFi) transceivers), IEEE 802.16 (a.k.a. WiMax), wireless local area network (WLAN) access point(s), and/or wireless access networks such as Global System for Mobile (GSM), code division multiple access (CDMA), and/or universal mobile telecommunications system (UMTS), etc. Moreover, the example EP network 130 of FIG. 1 may extend geographically to include a location near to and/or encompassing a VoIP device 105-108. For example, the IP network 130 may include a wireless access point (not shown) by which, for example, a WiFi network allows the VoIP device 105-108 to connect to the IP network 130.

To implement domain name service (DNS) lookups for the example VoIP devices 105-108 and/or, more generally, the example IP network 130, the example IP network 130 of FIG. 1 includes any number and/or type(s) of DNS servers, two of which are illustrated in FIG. 1 with reference numerals 135 and 136. Each of the example DNS servers 135, 136 of FIG. 1 includes one or more DNS SRV records 140 that allow the DNS servers 135, 136 to provide a fully qualified domain name (FQDN) for each of two or more edge devices 125-128 in response to a query (e.g., a DNS lookup) performed by a VoIP device 105-108 based on a logical identifier for a group, region and/or call serving office 115, 116. An example data structure that may be used to implement a DNS SRV record 140 for the example VoIP communication system of FIG. 1 is described below in connection with FIG. 8.

In the illustrated example of FIG. 1, each VoIP device 105-108, call serving office 115, 116, and edge device 125-128 is assigned to a group, two of which are illustrated in FIG. 1 with reference numerals 145 and 146. In the example communication system of FIG. 1, the VoIP devices 105-108, the call serving offices 115, 116, and the edge devices 125-128 are assigned to a group 145, 146 based upon their geographic location. However, VoIP devices 105-108, call serving office 115, 116, and/or edge device 125-128 may be assigned to groups 145, 146 based upon any additional and/or alternative criteria. For example, a first set of VoIP devices 105-108 may be assigned to a public group 145, 146 while a second set of VoIP devices 105-108 are assigned to a private group 145, 146.

Figure 2:
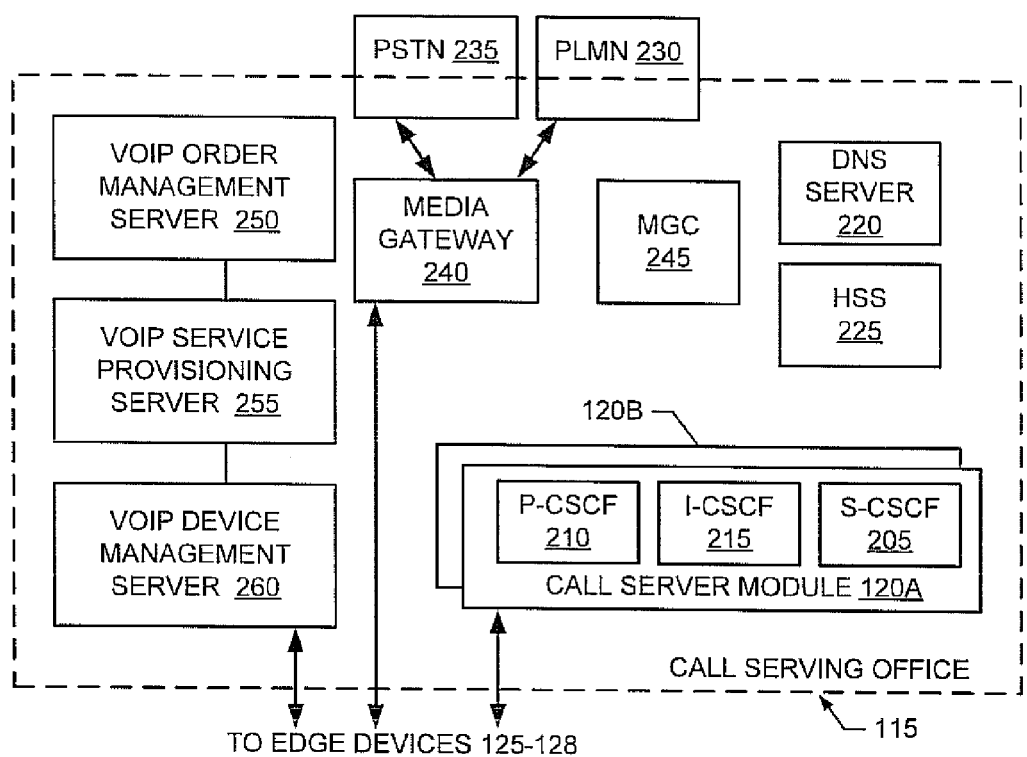
FIG. 2 illustrates an example manner of implementing any or all of the example call serving offices of FIG. 1.

Each example VoIP device 105-108 of FIG. 1, based upon its assigned geographic region 145, 146, is provided a logical identifier for its region 145, 146 (e.g., "_sbcwest._udp" or "_sbceast._udp"). In the example of FIG. 1, the logical identifier assigned to a VoIP device 105-108 is stored together with other provisioning data and/or parameters 150. Such provisioning data and/or parameters 150 may be provided to the VoIP devices 105-108 by, for example, a device management server 260 of the VoIP network 110 (FIG. 2).

The logical identifier assigned to a VoIP device 105-108 allows the VoIP device 105-108 to identify and/or communicate with an edge device 125-128 assigned to its group 145, 146 (i.e., a primary edge device 125-128). The logical identifier also allows the VoIP device 105-108 to identify and/or communicate with another edge device 125-128 associated with the same and/or a different group 145, 146 when its primary edge device 125-128 is not accessible. To identify an edge device 125-128 for VoIP devices 105-108 to use to, for example, perform a VoIP device registration, each of the example VoIP devices 105-108 includes a device selector 155. Based upon the logical identifier assigned to a particular VoIP device 105-108, the example device selector 155 performs a DNS lookup to obtain a FQDN for each of at least two edge devices 125-128 (e.g., a primary edge device 125-128 and an alternate edge device 125-128). The DNS server 135, 136 also provides a priority for each returned FQDN that allows the example device selector 155 to select and/or determine the primary edge device 125-128 assigned to the VoIP device 105-108. Based upon the FQDN for a selected edge device 125-128, the example device selector 155 of FIG. 1 performs a second DNS lookup to obtain an address (e.g., an IP address) for the identified edge device 125-128. The VoIP device 105-108 can then use the obtained address to communicate with the edge device 125-128 and/or, more generally, the example VoIP network 110.

To identify DNS servers 135, 136, each of the example VoIP devices 105-108 of FIG. 1 is provisioned and/or provided with an address for each of a primary DNS server 135, 136 and at least one backup DNS server 135, 136. In the example of FIG. 1, the addresses of DNS servers 135, 136 are stored together with a VoIP device's assigned logical identifier and/or other provisioning data and/or parameters 150. Such provisioning data and/or parameters 150 may be provided to the VoIP devices 105-108 by the VoIP network 110. An example data structure that may be used to store an assigned logical identifier and DNS server addresses is discussed below in connection with FIG. 7. If, when performing a DNS lookup, a VoIP device's primary DNS server (e.g., the example DNS server 135) is not available, its device selector 155 can perform another DNS lookup using the address of its backup DNS server (e.g., the example DONS server 136).

In the example of FIG. 1, the example DNS servers 135, 136 need not be associated with any particular region 145, 146. However, a particular DNS server 135, 136 may be assigned to a particular region 145, 146 such that VoIP devices 105-108 assigned to that region 145, 146 will use that DNS server 135, 136 as their primary DNS server 135, 136, with one or more additional DNS servers 135, 136 of a different and/or the same region serving as backups.

Presently consider the example VoIP device 105 of FIG. 1 that is assigned to edge device 125 in Region #1 145. Based upon the logical identifier for Region #1 145 (e.g., _sbcwest._udp) to which the VoIP device 105 is assigned, the device selector 155 performs a first DNS lookup using its primary DNS server (e.g., the DNS server 135). The DNS server 135 returns a FQDN for each of the edge device 125 and edge device 127. If the device selector 155 is unable to communicate with its primary DNS server 135, the device selector 155 attempts to communicate with its backup DNS server (e.g., the DNS server 136). The VoIP device 105 then performs two DNS lookups to obtain an IP address for the edge device 125 and an IP address for the edge device 127. Because the original DNS lookup response indicated that the edge device 125 has a higher priority than the edge device 127, the example device selector 155 uses the IP address obtained for the edge device 125 to, for example, register the VoIP device 105 to the VoIP network 110. If the example VoIP device 105 is unable to communicate with its primary edge device 125, the example device selector 155 uses the IP address for its backup edge device 127 to register the VoIP device 105. Persons of ordinary skill in the art will readily appreciate that the VoIP device 105 may, alternatively, perform the DNS lookup of the IP address for the backup edge device 127 only when the primary edge device 125 is not accessible. Example machine accessible instructions that may be executed to implement any of the example device selectors 155 and/or, more generally, any of the example VoIP devices 105-108 are described below in connection with FIGS. 10, 11A, 11B and 11C.

While the example VoIP devices 105-108 of FIG. 1 include device selectors 155 that implement substantially similar functionality, a particular device selector 155 implemented by any of the VoIP devices 105-108 may differ in any of a variety of ways from a device selector 155 implemented by any other of the VoIP devices 105-108. For example, a first example device selector 155 (e.g., implemented by a PC) may be implemented as machine accessible instructions executed by a processor, while a second example device selector 155 (e.g., implemented by a VoIP phone) is implemented as any combination of firmware, hardware and/or logic. Further, the device selector 155 may be an add-on functional module to some VoIP devices 105-108 and/or may be tightly integrated together with a VoIP device controller and/or a SIP User Agent. Moreover, the example device selectors 155 may differ in the number and/or type(s) of features they implement and/or perform. However, one or more of the VoIP devices 105-108 need not include a device selector 155. For example, when not all of the example VoIP device 105-108 implement and/or support redundancy in the example VoIP communication system of FIG. 1.

In the illustrated example of FIG. 1, the edge devices 125-128 are communicatively coupled to one or more call serving offices 115, 116. To select a call serving office 115, 116 to handle, for example, an incoming registration request, each of the example edge devices 125-128 includes one or more policies 160. The example policies 160 of FIG. 1 specify one or more call serving office 115, 116 available to and/or to which the edge device 125-128 is and/or may be communicatively coupled. Based upon its policy 160, an edge device 125-128 selects a call serving office 115, 116 and/or, more particularly, a call server module 120A-D implemented by and/or at the call serving office 115, 116. In the example VoIP network 110 of FIG. 1, the policies 160 are defined such that an edge device 125-128 will first attempt to communicate with a call serving office 115, 116 and/or a call server module 120A-D assigned to its region 145, 146 before attempting to communicate with a call serving office 115, 116 and/or call server module 120A-D assigned to another region 145, 146.

Because of the multiple communicative paths by which a VoIP device 105-108 may be able to communicate with elements of the example VoIP network 110, the example VoIP communication system of FIG. 1 is fault tolerant. In particular, if a primary DNS server 135, 136 is unavailable, a VoIP device 105-108 can utilize a backup DNS server 135, 136. Further, if a primary edge device 125-128 is unavailable, a VoIP device 105-108 can communicated with the VoIP network 110 via other edge devices 125-128. Further still, if a call server module 120A-D is unavailable, an edge device 125-128 can re-connect VoIP devices 105-108 to another call server module 120A-D of the same and/or a different call serving office 115, 116. Moreover, if a call serving office 115, 116 is unavailable, an edge device 125-128 can reconnect the VoIP devices 105-108 to another call serving office 115, 116 within the same and/or a different region 145, 146.

To maintain information concerning the availability of registered VoIP devices 105-108 and/or communicative paths between VoIP devices 105-108 and the call server modules 120A-D, the example edge devices 125-128 of FIG. 1 implement heart beat exchanges with the VoIP devices 105-108 and/or the call server modules 120A-D. Heart-beat exchanges may be accomplished using any number and/or type(s) of messages and/or protocol exchanges. For example, the VoIP device 105-108 may be provisioned with heart-beat time interval. At the expiration of its provisioned heart-beat interval, a VoIP device 105-108 could send, for example, a SIP OPTIONS message to its edge device 128-128 to indicate that it is "still alive". Likewise, the edge devices 125-125 can use a, potentially different, time interval to determine when to exchange heart-beat messages, such as SIP OPTIONS messages, with the call server modules 120A-D.

Additionally or alternatively, the edge devices 125-128 could perform registration caching to implement the heart-beat exchanges. For example, the call server modules 120A-D could implement VoIP device registrations having a long registration window (e.g., twenty-four hours), while the edge devices 125-128 modify registration response messages received from a call server module 120A-D before they are sent to VoIP devices 105-105. In particular, the example edge devices 105-108 would modify a field of the registration response message so that the modified registration response message specifies a shorter registration window (e.g., fifteen minutes). When, based on the shorter registration window, a VoIP device 105-108 attempts to re-register, the edge device 125-128 compares the age of the registration response received from the call server module 120A-D (e.g., the elapsed time since the VoIP device 105-108 was registered to a call server module 120A-D). If the age is less than a threshold (e.g., one-half the value of the original registration window, that is, twelve hours) and without sending a registration request to a call server module 120A-D, the edge device 125-128 responds to VoIP device 105-105 with a registration response message that indicates the re-registration was successful and specifying the shorter registration window (e.g., fifteen minutes). In this manner, the VoIP devices 105-108 can perform a SIP registration as a heart-beat exchange with the edge devices 125-125 frequently (i.e., shorter interval) without burdening the call server modules 120A-D. However, the edge devices 125-125 could perform the heart-beat exchanges with any relative ratio (e.g., equal, or more frequently with the call server modules 120A-D), based upon, for example, the relative reliability of VoIP devices 105-108, call server modules 120A-D and call serving offices 115, 116, and/or the communicative paths between them.

To determine and/or track the availability of the example call server modules 120A-D and/or the example call serving offices 115, 116, the example edge devices 125-128 of FIG. 1 also track the success and/or failure of communications with the call server modules 120A-D and/or the call serving offices 115, 116. To track the accessibility of the call server modules 120A-D) and/or, more generally the call serving offices 115, 116, the example edge devices 125-128 use heart-beat exchanges with the call server modules 120A-D. For example, the edge devices 125-128 periodically or a periodically send heart-beat messages, such as SIP OPTIONS messages, to each of the call server modules 120A-D to determine whether the call server modules 120A-D are accessible. In another example, when an edge device 125-128, for example, sends a SIP REGISTER and/or SIP INVITE message to a particular call server module 120A-D, the edge device 125-128 determines if, when and/or how often the call server module 120A-D fails to respond to such requests. By doing so, the example edge devices 125-128 of FIG. 1 can identify and/or determine unavailable, failing and/or failed call server modules 120A-D and/or, more generally, unavailable, failing and/or failed call serving offices 115, 116. When a VoIP device 105-108 attempts to send a SIP REGISTER and/or SIP INVITE message to a particular call server module 120A-D, the example edge device 125-128 handling the response checks if the call server module 120A-D and/or, more generally, the call serving office 115, 116 that implements the call server module 120A-D has been identified as unavailable, failing and/or failed. If the call server module 120A-D has been identified as unavailable, failing and/or failed, the edge device 195-128 determines if the sending device 105-108 has a valid registration. If the sending device 105-108 does not have an existing valid registration, the edge device 125-128 sends the SIP REGISTER/INVITE message to a different call server module 120A-D and/or, possibly a different call servings office 115, 116. If the sending device has an existing valid registration, the edge device 125-128 replies to the sending device 105-108 with an appropriate SIP error response. In this way, the example edge devices 125-128 maintain their knowledge of the health of the call server modules 120A-D without burdening the call server modules 120A-D with the processing of frequent re-registrations requests and/or additional application level heart-beats.

While an example VoIP communication system has been illustrated in FIG. 1, the devices, networks, systems, and/or processors illustrated in FIG. 1 may be combined, divided, re-arranged, eliminated and/or implemented in any of a variety of ways. Further, any or all of the example VoIP devices 105-108, the example device selectors 155, the example DNS servers 135, 136, the example edge devices 125-128, the example call serving offices 115, 116, the example call server modules 120A-D, the example VoIP network 110 and/or, more generally, the example VoIP communication system of FIG. 1 may be implemented by hardware, software, firmware and/or any combination of hardware, software and/or firmware. Moreover, the example VoIP communication system may include additional servers, systems, networks, gateways, portals, and/or processors than those illustrated in FIG. 1 and/or may include more than one of any or all of the illustrated devices, servers, networks, systems, gateways, portals, and/or processors.

FIG. 2 illustrates an example manner of implementing any or all of the example call serving offices 115, 116, and/or any or all of the example call server modules 120A-D of FIG. 1. While any of the call serving offices 115, 116 of FIG. 1 may be represented by FIG. 2, for ease of discussion, the example call serving office of FIG. 2 will be referred to as call serving office 115.

To handle and/or process VoIP communication services and/or communication sessions for VoIP devices, the example call serving office 115 of FIG. 2 includes any number and/or type(s) of call server modules 120A-B. The example call server modules 120A-B of FIG. 2 are responsible for handling VoIP communication sessions and/or services for a particular number of VoIP devices. While the particular VoIP devices 105-108 served by a particular call server module 120A-B may change over time, each call server module 120A-B typically has a maximum number of VoIP devices 105-108 it can support. The example call server modules 120A-B of FIG. 2 are implemented as replaceable cards inserted into a shelf or rack of communication equipment, and are implemented in pairs to provide redundancy, with one of the pair assigned to serve as a backup for the other one of the pair. Thus, if a primary call server module 120A fails, its backup call server module 120B can continue processing VoIP services and/or VoIP sessions for VoIP devices 105-108 registered to the primary call server module 120A. The number and/or type(s) of call server modules 120A-B implemented by and/or at a particular call serving office 115, 116 depends upon the number and/or type(s) of services and/or subscribers supported by the call serving office 115, 116.

In the illustrated example system of FIG. 1, each VoIP communication device 105-108 is registered to, associated with and/or assigned to a S-CSCF 205 responsible for handling incoming and/or outgoing calls associated with its registered VoIP devices 105-108. That is, an S-CSCF 205 performs sessions control, maintains session state and/or enables communication with application servers for its associated and/or registered VoIP devices 105-108. For instance, for a VoIP device 105-108 initiating an outgoing telephone call, a SIP INVITE message is routed by the VoIP network 110 to its associated S-CSCF 205 which, in turn, routes and/or assists in establishing a communication path and/or communication session (e.g., a telephone call) with a called device (i.e., a called party). Likewise, a VoIP device 105-108 receiving an incoming communication session receives a SIP INVITE message via its associated S-CSCF 205. In the example of FIG. 2, each call server module 120A-B includes any number and/or type(s) of S-CSCFs 205.

To provide an access entry point for a VoIP device 105-108 to the S-CSCF 205 to which it is registered and/or to be registered, each of the example call server modules 120A-B of FIG. 2 include any number and/or type(s) of P-CSCFs 210. The example P-CSCF 205 of FIG. 2, among other things, routes SIP messages between a VoIP device 105-108 and its S-CSCF 205.

To locate the S-CSC 205 associated with a VoIP device 105-108, each of the example call server modules 120A-B includes any number and/or type(s) of I-CSCFs 215. The example I-CSCF 215 of FIG. 2 serves as a contact point within the example call server office 115 and/or, more particular, a call server module 120A-B for all connections destined for a VoIP device 105-108 of the VoIP network 110 and/or for a VoIP device 105-108 currently located within the serving area of the VoIP network 110 (e.g., a roaming subscriber). For example, for an incoming communication session (e.g., a telephone call), the example I-CSCF 215 identifies which S-CSCF 205 to which the destination VoIP device 105-108 is registered. Based upon the S-CSCF 205 identified by the I-CSCF 215, the P-CSCF 210 uses I-CSCF 215 to route VoIP protocol messages between the VoIP device 105-108 and the S-CSCF 205.

To allow an edge device 125-128 to obtain the address of a particular P-CSCF 210, the example call server office 115 of FIG. 2 includes any number and/or type(s) of DNS servers 220. The example DNS server 220 of FIG. 2 implements DNS lookups for elements, servers, devices and/or modules of the example call server office 115. While the example DNS server 220 of FIG. 2 is associated with the example call server office 115, DNS servers 220 may, additionally or alternatively, be implemented elsewhere within the example VoIP network 110. In the example VoIP network 110 of FIG. 1, the DNS server(s) 220 are only accessible to elements, servers, devices and/or modules of the VoIP network 110 (including the edge devices 125-128). That is, die DNS server(s) 220 are not accessible to other devices (e.g. the example VoIP devices 105-108) communicatively coupled to the IP network 130. The example VoIP devices 105-108 are configured to use DNS servers 135-136 in the IP network 130.

To manage subscriber information and/or to enable subscribers and/or servers to locate destinations, the example call server office 115 of FIG. 2 includes any number and/or type (s) of home subscriber server(s) (HSS(s)) 225. The example HSS 225 of FIG. 2 maintains a profile and/or one or more preferences for each subscriber of the VoIP network 110. The example I-CSCF 215 of FIG. 2 uses information contained in the HSS 225 to determine and/or locate the S-CSCF 205 associated with a subscriber and/or a VoIP device 105-108.

To process and/or handle communication service data between any of the example VoIP devices 105-108 and a PLMN 230 (e.g., a cellular communication network) and/or a PSTN 235, the example call serving office 115 of FIG. 2 includes any number and/or type(s) of media gateways 240. Using any number and/or type(s) of technique(s), method(s) and/or algorithm(s), the media gateway 240 of FIG. 2 performs any necessary media data conversion between, for example, a circuit-based transmission format used by the PSTN 235 and a packet-based format and/or data structure used by the call serving office 115, the VoIP network 110, the IP network 130, and/or the VoIP devices 105-108.

To control the example media gateway 245, the example call serving office 115 of FIG. 2 includes any number and/or type(s) of media gateway controllers (MGC) 245. Using any number and/or type(s) of technique(s), method(s) and/or in accordance with any past, present and/or future specification (s) and/or standard(s) such as, for example, Internet Engineering Task Force (IETF) Request for Comment (RFC) 3015 and/or the ITU-T H.248 standard, the example MGC 245 of FIG. 2 performs signaling, session control and/or session management for incoming and/or outgoing VoIP communication sessions that originate in and/or terminate in, for example, the example PLMN 230 and/or the PSTN 235.

As illustrated in FIG. 2, the example call serving office 115 may include an interface to and/or contain a portion of the PLMN 230, an interface to and/or contain a portion of the PSTN 135, and/or an interface to and/or contain a portion of any number and/or type(s) of additional communication networks. For example, using any number and/or type(s) or technique(s), method(s), protocol(s) and/or technology(-ies), the media gateway 240, the MGC 245 and the PSTN 235 can facilitate telephone calls between a PSTN-based phone (not shown) and any of the example VoIP devices 105-108.

The example PLMN 230 and/or the example PSTN 235 of FIG. 2 may be implemented by any number and/or type(s) of communication devices, switches, protocols, systems and/or technologies. For instance, the example PLMN 230 may include any number of cellular base stations that can transmit cellular signals to and/or receive cellular signals from a cellular communication device (not shown) using any type(s) of protocols (e.g., time-division multiple access (TDMA), code-division multiple access (CDMA), orthogonal frequency-division multiple access (OFDM), etc.). In some examples, an interface between the MGC 240 and the PLMN 230 is implemented via the PSTN 235.

To configure new and/or re-configure existing subscriber accounts, the example call serving office 115 of FIG. 2 includes an order management server 250. The example order management server 250 of FIG. 2 allows a customer service representative, a technician, a subscriber, etc. to establish, remove and/or modify subscriber accounts. The order management server 250 may include and/or implement, for example, a web-based server that provides any number and/or type(s) of web-based interfaces to establish, remove and/or modify subscriber accounts. In some examples, the order management server 250 provides any number and/or type(s) of customized interfaces accessible only to operators, customer service representatives and/or technicians of the VoIP communication network 110.

To provision and/or configure VoIP services to the VoIP devices 105-108, the example call serving office 115 of FIG. 2 includes a VoIP service provisioning server 255 and a VoIP device management server 260. When, and/or as instructed, by the example service provisioning server 255 and using any number and/or type(s) of technique(s), method(s) and/or protocol(s), the example device management server 260 informs one or more of the example VoIP devices 105-108 when service provisioning and/or service configuration information and/or parameters 150 (FIG. 1) are available for downloading and/or installation. Additionally or alternatively, the example device management server 260 may send the service provisioning and/or service configuration information and/or parameters 150 directly to one or more of the VoIP devices 105-108. Example service provisioning and/or configuration information 150 includes a logical identifier for an assigned group, and an IP address for each of one or more DNS servers 135, 136. In some example call server offices 115 and/or VoIP networks 110, the device management sever 260 is implemented by and/or is a part of an element management system and/or server.

While the example call serving office 115 of FIG. 2 includes an order management server 250, a service provisioning server 255 and a device management server 260, a particular call serving office 115 need not include any or all of the example servers 250, 255, 260. For example, a single order management server 250, a single service provisioning server 255 and a single device management server 260 may be implemented to perform order management, service provisioning and/or device management for two or more call serving offices 115 and/or for a VoIP network 110. Further, order management servers 250, service provisioning servers 255 and/or device management servers 260 may be located in one or more different data centers and/or operation centers other than the example call serving office 115 of FIG. 2.

It will be readily appreciated by persons of ordinary skill in the art that the example the example S-CSCF 205, the example P-CSCF 210, the example I-CSCF 215, the example HSS 225, the example DNS server 220, the example media gateway 240 and the example MGC 245 illustrated in FIG. 2 are logical entities in IP multimedia sub-system (IMS) based VoIP networks, such as the example VoIP network 110 of FIG. 1. They may be implemented, for example, as machine accessible instructions executed by one or more computing devices and/or computing platforms. Further, while an example call serving office 115 has been illustrated in FIG. 2, the example logical entities of the call serving office 115 may be combined, split, re-arranged, eliminated and/or implemented in any of a variety of ways. Further still, the example S-CSCF 205, the example P-CSCF 210, the example I-CSCF 215, the example DNS server 220, the example HSS 225, the example media gateway 240, the example MGC 245 and/or, more generally, the example call serving office 115 may be implemented by hardware, software, firmware and/or any combination of hardware, software and/or firmware. Moreover, call serving office may include additional logical entities and/or may include more than one of any of the illustrated logical entities. For example, one or more application servers (not shown) can be included to provide additional service features to subscribers (e.g., voicemail, call trees, etc.).

Figure 3:
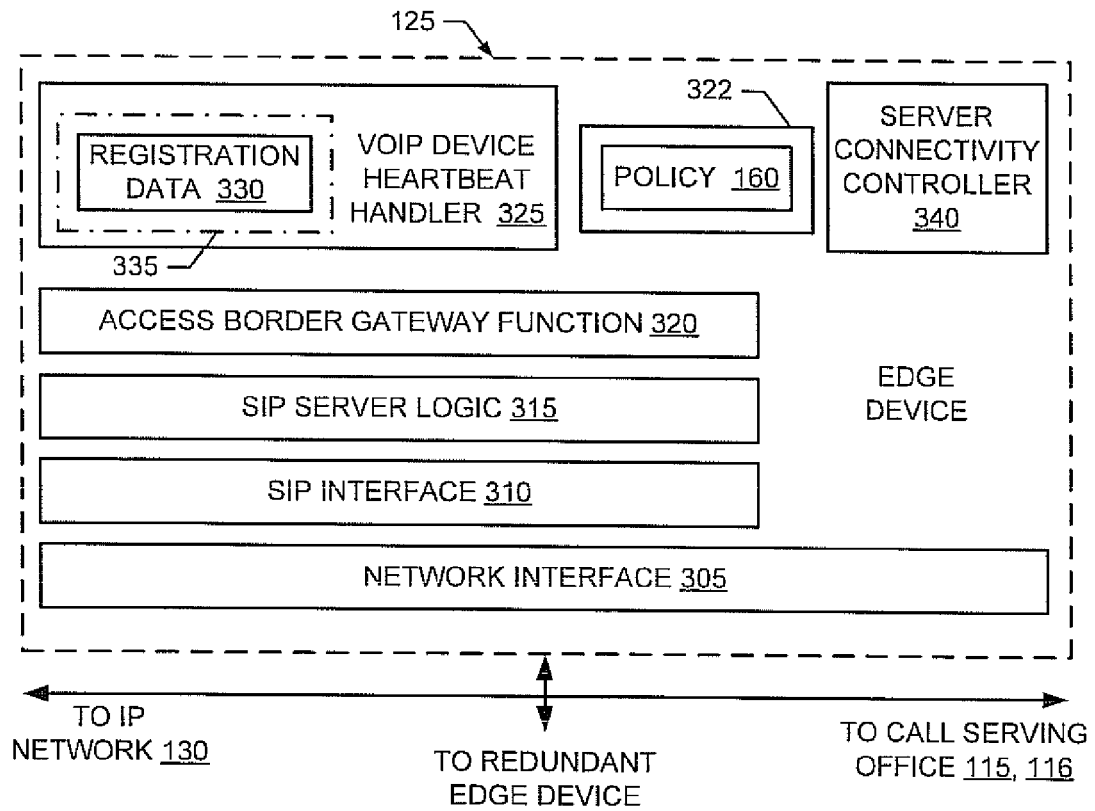
FIG. 3 illustrates an example manner of implementing any or all of the example edge devices of FIG. 1.

FIG. 3 illustrates an example manner of implementing any or all of the example edge devices 125-128 of FIG. 1. While any of the edge devices 125-128 may be represented by FIG. 3, for ease of discussion, the device of FIG. 3 will be referred to as edge device 125.

To communicatively couple the example edge device 125 of FIG. 3 to the IP network 130, a redundant backup edge device (e.g., the example backup edge device 126 of FIG. 1) and the example call serving offices 115, 116, the edge device 125 includes one or more network interfaces 305. The exam pie network interface 305 of FIG. 3 implements any communication and/or data interface(s) in accordance with any past, current and/or future standards and/or specifications such as the IEEE 802.3x Ethernet family of standards. The example network interface 305 includes one or more transmission control protocol (TCP)/IP stacks. However, TCP/IP stacks may, additionally or alternatively, be implemented as a part of a device operating system and/or as a part of interface firmware and/or any combination thereof.

To process SIP messages and/or protocols, the example edge device 125 of FIG. 3 includes any number and/or type(s) of SIP interfaces 310 and any number and/or type(s) of SIP server logic modules 315. The example SIP interface 310 of FIG. 3 handles and/or processing incoming and/or outgoing SIP messages. The example SIP server logic 315 of FIG. 3 implements a state engine and/or maintains state information for SIP transactions, dialogs, and communication sessions including, for example, handling registrations and incoming/outgoing calls as defined in Internet Engineering Task Force (IETF) Request for Comment (RFC) 3161.

To implement border and/or gateway functions, the example edge device 125 of FIG. 2 includes any number and/or type(s) of access border gateway functions 320, such as a session border controller as defined by Alliance for Telecommunications Industry Solutions (ATIS)/Telecoms & Internet converged Services & Protocols for Advanced Networks (TISPAN) for Next Generation Networks (NGN).

To define one or more rules for selecting a call server module 120A-D, a P-CSCF 210 (FIG. 2) and/or, more generally, a call serving office 115, 116, the example edge device 125 of FIG. 3 includes the policy 160. The example policy 160 of FIG. 3 contains a prioritized listing of possible call serving offices 115, 116, and a list of available P-CSCFs 210 at each call serving office 115, 116. Example data structures that may be used to implement the example policy 160 are described below in connection with FIGS. 9A, 9B and 9C. In the illustrated example of FIG. 3, the example policy 160 is stored in any number and/or type(s) of data storage device(s) and/or memory(-ies) 322.

To handle and/or perform heart-beat exchanges with the VoIP devices 105-108, the example edge device 125 of FIG. 3 includes a VoIP device heartbeat handler 325. Using any algorithm(s), logic, message(s) and/or exchange(s), the example VoIP device heartbeat handler 325 of FIG. 3 receives and/or responds to heart-beat messages received from a VoIP device 105-108. Based upon received heartbeat messages, the VoIP device heartbeat handler 325 updates, for example, a list of available VoIP devices 105-108 (e.g., example registration data 330). Example machine accessible instructions that may be executed to implement the example VoIP device heartbeat handler 325 of FIG. 3 are described below in connection with FIGS. 12A and 12B. An example heart-beat message is a SIP OPTIONS message that is sent by the VoIP devices 105-108 based a heart-beat timer duration provisioned into the VoIP devices 105-108 by, for example, the example VoIP service provisioning server 255 of FIG. 2.

Additionally or alternatively, the example VoIP device heartbeat handler 325 of FIG. 3 maintains information concerning the availability of VoIP device 105-108 by, together with the SIP server logic 315, controlling the handling of registration requests between the VoIP devices 105-108 and the P-CSCFs 210 (FIG. 2) based on a first registration timing window for the VoIP devices 105-108 and a second registration timing window for the call serving modules 120A-D. As such, the example VoIP device heartbeat handler 325 of FIG. 3 directs the access border gateway function 320 to modify a field of a registration response received from a P-CSCF 210 before the registration response is sent to a VoIP device 105-108. In particular, the access border gateway function 320 modifies the field to reflect a shorter registration window (e.g., fifteen minutes) than the registration window specified by the P-CSCF 210 (e.g., twenty-four hours). Thus, the example VoIP device heartbeat handler 325 and the access border gateway function 320 cause the VoIP device 105-108 to perform re-registrations more frequently, thereby allowing each individual VoIP device 105-108 to discover any server office failures quickly.

Continuing with this example, when, based on the shorter registration window, a VoIP device 105-108 attempts to re-register, the example VoIP device heartbeat handler 325 of FIG. 3 compares the age of the registration response received from the P-CSCF 210 (e.g., the elapsed time since it was received). If the age is less than a threshold (e.g., one-half the value of the original registration window, that is, twelve hours) and without sending a registration request to the P-CSCF 210, the example VoIP device heartbeat handler 325 directs the SIP server logic 315 to respond to the VoIP device 105-108 with a registration response message that indicates the re-registration was successful and specifying the shorter registration window (e.g., fifteen minutes). In this manner, the example VoIP device heartbeat handler 325 of FIG. 3 effectively performs heart-beat exchanges with each individual VoIP device 105-108 at a higher frequency (i.e., shorter interval) than with P-CSCFs 210.

To maintain information concerning available VoIP devices 105-108 based upon the handling of registration requests, the example edge device 125 of FIG. 3 includes registration data 330. The example registration data 330 of FIG. 3 stores for each of a plurality of registered VoIP devices 105-108 the identifier and/or IP address of a P-CSCF 210. If SIP registrations are used to implement heart-beat exchanges, the registration data 330 may also store, in addition to other data and/or values, a time at which the last registration with the P-CSCF 210 occurred. Example data structures that may be used to implement the example registration data 330 are described below in connection with FIGS. 5A and 5B. In the illustrated example of FIG. 3, the example registration data 330 is stored in any number and/or type(s) of data storage device(s) and/or memory(-ies) 335.

To track the availability of call serving offices 115, 115, call servers 120A-D, and/or P-CSCFs 210, the example edge device 125 of FIG. 3 includes a server connectivity controller 340. The example server connectivity controller 340 of FIG. 3 tracks messages sent to call serving offices 115, 115, call servers 120A-D, and/or P-CSCFs 210 and corresponding responses to determine whether the call serving offices 115, 115, call servers 120A-D, and/or P-CSCFs 210 are available. Example machine accessible instructions that may be executed to implement the example server connectivity controller 340 are described below in FIG. 12.

To maintain the state of a redundant edge device 125-128, the example edge device 125 of FIG. 3 (when operating as a primary edge device 125), provides and/or sends registration data updates and/or modifications and session border controller state information to its designated backup edge device 125-128. Any logic, method(s), technique(s), protocol(s), memory(-ies), and/or interlace(s) may be used to send and/or provide the cache and/or state information to a backup edge device 125-128.

While an example edge device 125 is illustrated in FIG. 3, the example edge device 125 may be implemented using any number and/or type(s) of other and/or additional logic, processors, devices, components, circuits, modules, interfaces, etc. Further, the logic, processors, devices, components, circuits, modules, elements, interfaces, etc. illustrated in FIG. 3 may be combined, divided, re-arranged, eliminated and/or implemented in any of a variety of ways. Additionally, the example edge device 125 may be implemented as any combination of firmware, software, logic and/or hardware. For example, the example edge device 125 may be implemented as coded instructions (e.g., the example coded instructions 1310 and/or 1312 of FIG. 13) executed by, for example, the example processor 1305 of FIG. 13. Moreover, the example edge device 125 may include additional logic, processors, devices, components, circuits, interfaces and/or modules than those illustrated in FIG. 3 and/or may include more than one of any or all of the illustrated processors, devices, components, circuits, interfaces and/or modules.

Figure 4:
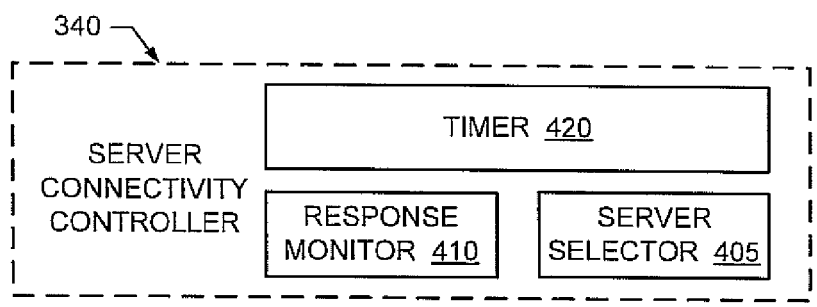
FIG. 4 illustrates an example manner of implementing the example server connectivity controller of FIG. 3.

FIG. 4 illustrates an example manner of implementing the example server connectivity controller 340 of FIG. 3. To select a P-CSCF 210 and/or a call serving office 115, 116, the example server connectivity controller 340 of FIG. 4 includes a server selector 405. The example server selector 405 of FIG. 4 implements the rules defined by a policy (e.g., the example policy 160 of FIG. 3) to select a call serving office 115, 116 and a P-CSCF 210 implemented by and/or within a selected office 115, 116. The example server selector 405 relies on the services provided by a response monitor 410 that monitors responses from server offices 115, 116 and P-CSCFs 210 to identify and/or determine unavailable, failing and/or failed call server offices 115, 116 and/or unavailable, failing and/or failed P-CSCFs 210. For a selected P-CSCF 210, the example server selector 405 can perform a DNS lookup to obtain the IP address of the selected P-CSCF 210.

The example server connectivity controller 340 of FIG. 4 includes a response monitor 410. The example response monitor 410 of FIG. 4 monitors SIP messages sent to and/or received from call serving offices 115, 115, call servers 120A-D, and/or P-CSCFs 210 to determine the availability of the call serving offices 115, 115, call servers 120A-D, and/or P-CSCFs 210. The example response monitor 410 determines when a call serving office 115, 115, a call server 120A-D, and/or a P-CSCFs 210 is out of service based on one or more timeouts associated with sent SIP messages and/or received SIP error responses. Such timeouts may be defined by and/or based on one or rules and/or values of the policy 160. Example machine accessible instructions that may be executed to implement the example response monitor 410 are described below in connection with FIGS. 12A and 12B.

To allow the response monitor 410 to determine one or more parameters associated with responses to messages, the example server connectivity controller 340 of FIG. 4 includes any number and/or type(s) of timers 420. The example timer(s) 420 of FIG. 4 are used to determine, for example, the elapsed time since message was sent, how many timeouts have occurred wailing for a response, how many attempts have been made to send a message, how long since a call serving office 115, 116, a call server 120A-D and/or a P-CSCF 210 was marked as unavailable.

While an example server connectivity controller 340 is illustrated in FIG. 4, the example server connectivity controller 340 may be implemented using any number and/or type(s) of other and/or additional logic, processors, devices, components, circuits, modules, interfaces, etc. Further, the logic, processors, devices, components, circuits, modules, elements, interfaces, etc. illustrated in FIG. 4 may be combined, divided, re-arranged, eliminated and/or implemented in any of a variety of ways. Additionally, the example server connectivity controller 340 may be implemented as any combination of firmware, software, logic and/or hardware. For example, the example server connectivity controller 340 may be implemented as coded instructions (e.g., the example coded instructions 1310 and/or 1312 of FIG. 13) executed by, for example, the example processor 1305 of FIG. 13. Moreover, the example server connectivity controller 340 may include additional logic, processors, devices, components, circuits, interfaces and/or modules than those illustrated in FIG. 4 and/or may include more than one of any or all of the illustrated processors, devices, components, circuits, interfaces and/or modules.

Figure 5A:
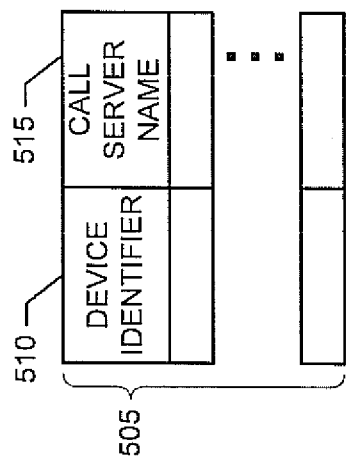
FIGS. 5A and 5B illustrate an example data structures that may be used to implement the example registration data of FIG. 3.

FIG. 5A illustrates an example data structure that may be used to implement the example registration data 330 of FIG. 3. The example data structure of FIG. 5A may be used when heart-beat exchanges are performed using, for example, SIP OPTIONS, messages sent by VoIP devices 105-108 based upon a heart-beat timer provisioned into the VoIP devices 105-108. The example data structure of FIG. 5A contains a plurality of entries 505 for respective ones of a plurality of registered VoIP devices 105-108. To identify the VoIP device 105-108, each of the entries 505 of FIG. 5A includes a device identification field 510. The example device identification field 510 of FIG. 5A contains a value and/or alphanumeric string that uniquely identifies the corresponding VoIP device 105-108, such as a SIP uniform resource identifier (URI) (e.g., SIP: joe@voip.att.com) or a telephone number URI (e.g., a 10-digit telephone number). The device identification field 510 may represent a private user identifier and/or a public user identifier.

To identify call server to which a VoIP device 105-108 is registered, each of the example entries 505 of FIG. 5A includes a call server name identifier field 515. The example call server name identifier field 515 of FIG. 5A contains a value and/or alphanumeric string that represents, for example, a P-CSCF 210. An example alphanumeric string that represents a P-CSCF 210 is a FQDN such as pcscf1.att.com. If a VoIP device 105-108 is not currently available, its call server name identifier field 515 contains a null value and/or string.

Figure 5B:
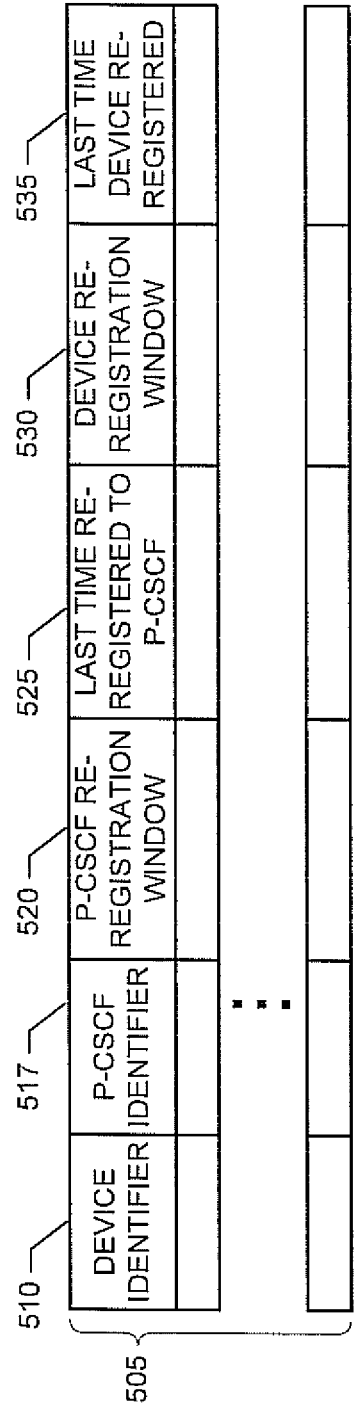

FIG. 5B illustrates another example data structure that may be used to implement the example registration data 330 of FIG. 3. The example data structure of FIG. 5B may be used when heartbeat exchanges are performed based upon registration timing windows that are controlled by an edge device 125-128. The example data structure of FIG. 5B contains a plurality of entries 505 for respective ones of a plurality of registered VoIP devices 105-108. To identify the VoIP device 105-108, each of the entries 505 of FIG. 5B includes a device identification field 510. The example device identification field 510 of FIG. 5B contains a value and/or alphanumeric string that uniquely identifies the corresponding VoIP device 105-108, such as a SIP URI (e.g. SIP: joe@voip.att.com) or a telephone number URI (e.g., a 10-digit telephone number). The device identification field 510 may represent a private user identifier and/or a public user identifier.

To identify the P-CSCF 210 to which a VoIP device 105-108 is registered, each of the example entries 505 of FIG. 5B includes a P-CSCF identifier field 517. The example P-CSCF identifier field 517 of FIG. 5B contains a value and/or alphanumeric string that represents a P-CSCF 210. An example alphanumeric string that represents a P-CSCF 210 is a FQDN such as pcscf1.att.com.

To specify a re-registration window for the P-CSCF identified by the P-CSCF identifier field 515, each of the example entries 505 of FIG. 5B includes a P-CSCF re-registration window field 520. The example P-CSCF re-registration window field 520 of FIG. 5B contains a value that represents the duration of an active registration.

To specify the last time at which the device identified by the device identifier field 510 was actually re-registered to the P-CSCF 210, each or the example entries 505 of FIG. 5B includes a last time re-registered to P-CSCF field 525. The example last time re-registered to P-CSCF field 525 of FIG. 5B contains a value that represents the most recent timestamp at which the VoIP device 105-108 successfully re-registered to its P-CSCF 210.

To specify a re-registration window for the device identified by the device identifier field 510, each of the example entries 505 of FIG. 5B includes a device re-registration window field 530. The example device re-registration window field 530 of FIG. 5B contains a value that represents the duration of the current registration for the device. As discussed above, the value stored in the field 530 will be shorter than the value stored in the field 520 to implement a more frequency heartbeat exchange between the VoIP devices 105-108 and the edge devices 125-128 than between the edge devices 125-128 and the P-CSCFs 210. In the examples discussed herein, the values stored in the fields 520 and 530 are taken and/or determined from the example policy 160.

To specify the time at which the VoIP device 105-108 was re-registered to the edge device 125-128 (e.g. sent re-registration request that the edge device 125-128 responded to without forwarding the re-registration request to a P-CSCF 210), each of the example entries 505 of FIG. 5B includes a re-registration time field 535. The example registration time field 535 of FIG. 5B contains a value that represents the timestamp when the VoIP device 105-108 successfully re-registered to the edge device 125-128. If the VoIP device 105-108 does not have a valid and/or current registration, the field 535 can contain a value, such as a negative value, that indicates that the VoIP device 105-108 is not currently registered.

While example data structures are illustrated in FIGS. 5A and 5B, the example data structures may be implemented using any number and/or type(s) of other and/or additional fields and/or data. Further, the fields and/or data illustrated in FIGS. 5A and 5B may be combined, divided, re-arranged, eliminated and/or implemented in any of a variety of ways. Moreover, the example data structure may include additional fields and/or data than those illustrated in FIGS. 5A and 5B and/or may include more than one of any or all of the illustrated fields and/or data.

FIG. 6 illustrates an example data structure that may be used to implement a SIP message, such as a SIP registration response message (e.g., a SIP 200 OK message). To identify the SIP message, the example data structure of FIG. 6 includes a name field 605. The example name field 605 of FIG. 6 includes an alphanumeric string that identifies the SIP message and identifies a destination for the example message. The example SIP message illustrated in FIG. 6 is a SIP 200 OK message and, thus, the example name field 605 contains a string that includes "200 OK". Such a SIP message may be sent to, for example, indicate that a registration of a VoIP device 105-108 has completed successfully. In the illustrated example, the SIP message is addressed to userb@att.com. Persons of ordinary skill in the art will readily recognize that the name field 605 could be used to identify any type of SIP message to any applicable destination.

To provide additional values and/or parameters, the example data structure of FIG. 6 includes one or more header fields 610. Example header fields 610 include, but are not limited to, a from field, a caller identification field, a command sequence number field, and/or an expires field 615. The number of header fields 610, in some examples, depends upon the type of SIP message and/or the protocol(s) implemented by either endpoint. The example expires header 615 of FIG. 6 contains a value 620 that represents the duration of a registration window (e.g., twenty-four hours or fifteen minutes). To convey and/or carry any number and/or type(s) of additional data and/or information, the example data structure of FIG. 6 includes a payload 620.

While an example data structure is illustrated in FIG. 6, the example data structure may be implemented using any number and/or type(s) of other and/or additional fields and/or data. Further, the fields and/or data illustrated in FIG. 6 may be combined, divided, re-arranged, eliminated and/or implemented in any of a variety of ways. Moreover, the example data structure may include additional Fields and/or data than those illustrated in FIG. 6 and/or may include more than one of any or all of the illustrated fields and/or data.

FIG. 7 illustrates an example data structure that may be used to implement at least a portion of the example configuration data and/or information 150 of FIG. 1. To specify a logical identifier of a group assigned to a VoIP device 105-108, the example data structure of FIG. 7 includes a group identifier field 705. The example group identifier field 705 of FIG. 7 contains an alphanumeric string that represents a logical FQDN and allows a VoIP device 105-108 and/or, more particularly, the example device selector 155 of FIG. 1 to perform a DNS lookup to obtain a FQDN for each of one or more edge devices 125-128.

To specify one or more DNS servers 135, 136 (FIG. 1) that may be used to perform the DNS lookup, the example data structure of FIG. 7 includes one or more address fields 710. Each of the example address fields 710 contains an IP address 715 of a DNS server (e.g., one of the DNS servers 135, 136 of FIG. 1). In the illustrated example of FIG. 7, the address fields 710 are listed and/or stored in the order in which they should be utilized. For example, a DNS look up should first be tried to IP address 142.30.79.10.

While an example data structure is illustrated in FIG. 7, the example data structure may be implemented using any number and/or type(s) of other and/or additional fields and/or data. Further, the fields and/or data illustrated in FIG. 7 may be combined, divided, re-arranged, eliminated and/or implemented in any of a variety of ways. Moreover, the example data structure may include additional fields and/or data than those illustrated in FIG. 7 and/or may include more than one of any or all of the illustrated fields and/or data. For example, the data structure may contain a telephone number and/or SIP URI assigned to a VoIP device 105-108 and/or one or more codec type, encoding data rate and/or quality-of-service (QoS) parameters.

FIG. 8 illustrates an example data structure that may be used to implement the example DNS SRV records 140 of FIG. 1. The example data structure of FIG. 8 contains a plurality of entries 805 for respective ones of a plurality of logical identifiers 810 and 815. To identify one or more edge devices 125-128 that may be used by VoIP devices 105-108 assigned to one of the logical identifiers 810, 815, each of the example entries 805 of FIG. 8 includes one or more device identifier entries 820 for respective ones of a plurality of FQDNs 822. In the example system of FIG. 1, each VoIP device 105-108 is provisioned with the logical FQDN identifier 810, 815 for the region to which it is assigned (e.g., one of the example regions 145, 146 of FIG. 1). The VoIP devices 105-108 store their FQDN identifier 810, 815 in their respective configuration data 150 as described above in connection with FIG. 7.

To specify the priority of each FQDN 822, each of the example device identifier entries 820 of FIG. 8 include a priority field 825 and a weight field 830. The example priority field 825 contains a value that represents the relative priority of the corresponding FQDN 822. For example, a smaller value represents a higher priority. The example weight field 830 contains a value that represents the relative weight of the corresponding FQDN 822, and is used, for example, when two FQDNs 822 have the same priority. In the illustrated example of FIG. 8, a VoIP device 105-108 assigned the logical identifier 810 is to use the edge device 125-128 having a FQDN of ims-core1.att.com before using the edge device 125-128 having a FQDN of ims-core2.att.com. However, in the example of FIG. 8, a VoIP device 105-108 assigned the logical identifier 815 is to use the edge devices 125-128 in the reverse order.

To specify an IP address for each of the FQDNs 822, the example data structure of FIG. 8 contains respective address entries 835. For each FQDN 822, the example entries 835 of FIG. 8 contain an address field 840. The example address fields 840 of FIG. 8 contain a value that represents the IP address of an associated FQDN 822.

While an example data structure is illustrated in FIG. 8, the example data structure may be implemented using any number and/or type(s) of other and/or additional fields and/or data. Further, the fields and/or data illustrated in FIG. 8 may be combined, divided, re-arranged, eliminated and/or implemented in any of a variety of ways. Moreover, the example data structure may include additional fields and/or data than those illustrated in FIG. 8 and/or may include more than one of any or all of the illustrated fields and/or data. For example, the data structure may contain entries 805 for any number of logical identifiers 810, 815, and/or entries 820 for any number of FQDNs 822 associated with any of the entries 805. Moreover, each logical identifier entry 805 need not contain the same number of entries 820.

Figure 9A:
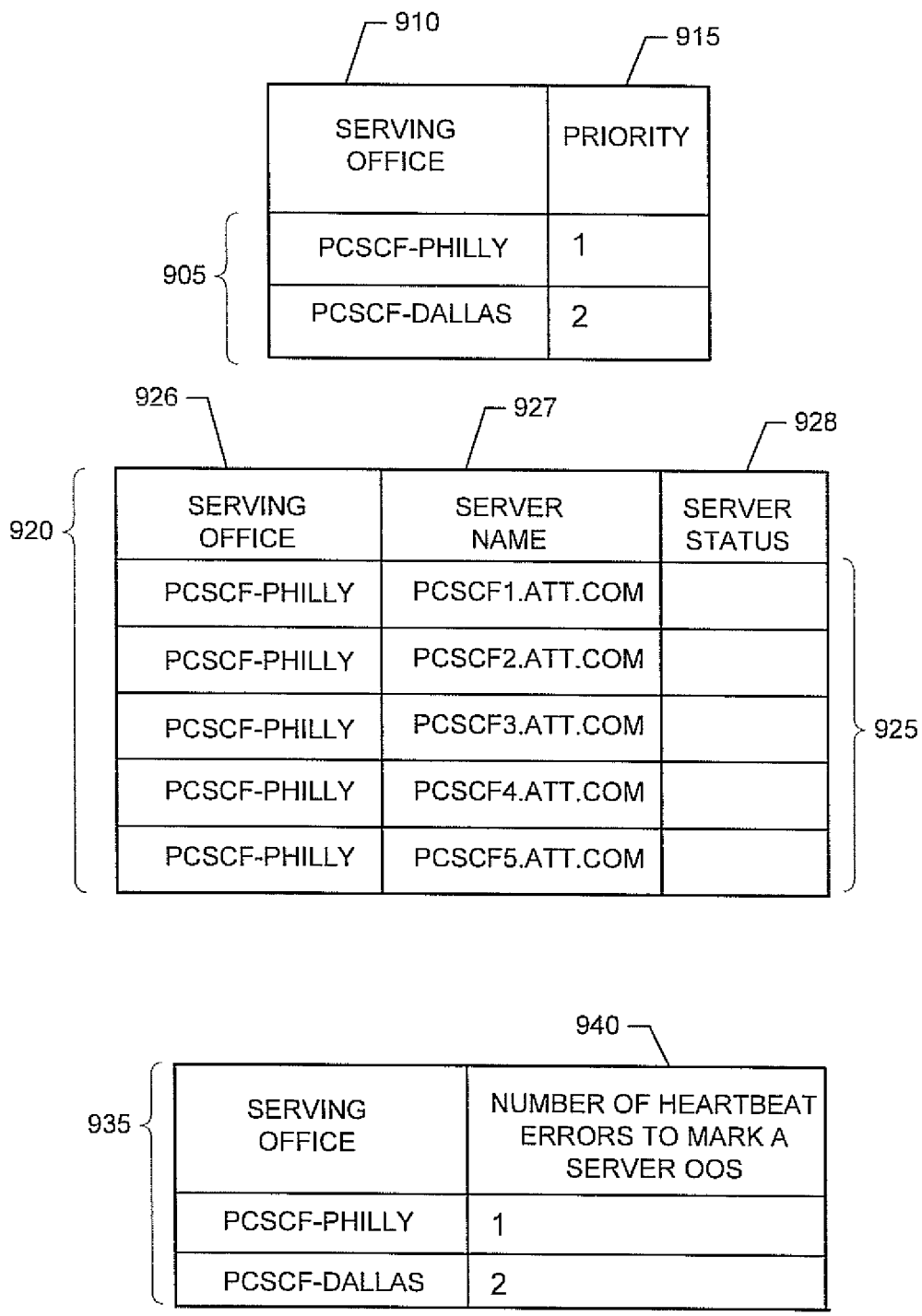

FIG. 9A illustrates an example data structure that may be used to implement the example policies 160 of FIGS. 1 and 3. To specify the order in which an edge device 125-128 is to try call serving offices 115, 118, the example data structure of FIG. 9A includes a plurality of entries 905 for respective ones of a plurality call serving offices 115, 116. To specify a call serving office 115, 116, each of the entries 905 of FIG. 9A includes a call serving office identifier 910. The example identifiers 910 of FIG. 9A each contain an alphanumeric string that represents a particular call serving office 115, 116.

To specify the priority assigned to a call serving office 115, 116, each of the entries 905 of FIG. 9A includes a priority field 915. Each of the example priority fields 915 of FIG. 9A contain a value that represents a priority associated with using the associated call serving office identified by the identifier field 910.

For each call serving office 115, 116 identified in the example entries 905, the example data structure of FIG. 9A includes a data structure that defines the P-CSCFs 210 implemented by and/or at the call serving office 115, 116. An example data structure 920 is illustrated in FIG. 9A. The example data structure 920 of FIG. 9A contains a plurality of entries 925 for respective ones of P-CSCFs 210 implemented by and/or at the call serving office 115, 116. To specify a serving office, each of the example entries 925 of FIG. 9A contains a serving office field 926. The example service office field 926 contains a value and/or alphanumeric string that represents a particular service office 115, 116.

To specify a call server (e.g., a P-CSCF 210), each of the example entries 925 of FIG. 9A contains a server name field 927. The example server name field 927 of FIG. 9A contains a value and/or alphanumeric string that represents a FQDN of a P-CSCF 210.

To specify the status of a call server, each of the example entries 925 of FIG. 9A contains a server status field 928. The example server status field 928 of FIG. 9A contains a value and/or flag that represents whether or not the corresponding call server is accessible.

For each of the call serving offices 115, 116 identified in the example entries 905, the example data structure of FIG. 9A includes a respective entry 935 that defines one or more network and/or timeout parameters associated with the call serving office 115, 116. To identify the number of timeouts (e.g., no response to a SIP OPTIONS message) before a P-CSCF 210 associated with a call serving office 115, 116 is identified as inaccessible, each of the example entries 935 of FIG. 9A includes a timeouts Field 940. The example timeouts field 940 of FIG. 9A contains a value that represents the number of consecutive SIP request timeouts (e.g., one) that can occur before a P-CSCF 210 is marked as unavailable.

FIG. 9B illustrates another example data structure that may be used to implement the example policies 160 of FIGS. 1 and 3. Many of the fields illustrated in FIG. 9B are identical to those discussed above in connection with FIG. 9A and, thus, the description of the identical fields is not repeated here. Instead, identical fields are illustrated with identical reference numerals in FIGS. 9A and 9B, and the interested reader is referred back to the descriptions presented above in connection with FIG. 9A for a complete description of those like numbered fields.

To specify the manner and/or method by which P-CSCFs 210 associated with the entries 905 are to be selected, the example entry 905 of FIG. 9B includes a strategy field 917. The example strategy field 917 of FIG. 9B contains a value and/or alphanumeric string that represents the manner and/or method by which a P-CSCF 210 at a call serving office 115, 116 is to be selected. For instance, in the example of FIG. 9B, P-CSCFs 210 for PCSCF-PHILLY 115, 116 are to be selected round robin.

To identify the time alter which a P-CSCF 210 associated with a call serving office 115, 116 may be re-tried after being marked down and/or unavailable, each of the example entries 935 of FIG. 9B contains a time-to-resume field 945. The example time-to-resume field 945 of FIG. 9B contains a value that represents the time that must elapsed before a P-CSCF 210 that has been marked as unavailable may be used again (e.g., 600 seconds).

To specify the number of times that an edge device 125-128 may attempt to send a particular SIP message to the P-CSCF 210 associated with a call serving office 115, 116, each of the example entries 935 of FIG. 9B includes a re-try count field 950. The example re-try count field 950 of FIG. 9B contains a value that represents the number of attempts (e.g. one) that are to be made to send a SIP message to the P-CSCF 210 before selecting a different P-CSCF 210 and/or a different call serving office 115, 116.

To specify the time between attempts, each of the example entries 935 of FIG. 9B includes a re-try timer field 955. The example re-try timer field 955 of FIG. 9B contains a value that represents the time that must elapse between attempts to contact a P-CSCF 210. In one example embodiment, the T1 timer 955 is used in compliance with IETF RFC 3261 that includes derivations of other SIP timer values, such as TIMER A, B, etc.

FIG. 9C illustrates yet another example data structure that may be used to implement the example policies 160 of FIGS. 1 and 3. Because the fields illustrated in FIG. 9C are identical to those discussed above in connection with FIGS. 9A and/or 9B, the description of the identical fields is not repeated here. Instead, identical fields are illustrated with identical reference numerals in FIGS. 9A, 9B and 9C, and the interested reader is referred back to the descriptions presented above in connection with FIGS. 9A and/or 9B for a complete description of those like numbered fields. While not illustrated in FIG. 9C, server status fields similar to those discussed above in connection with FIGS. 9A and 9B could be included.

While example data structures are illustrated in FIGS. 9A, 9B and 9C, the example data structures may be implemented using any number and/or type(s) of other and/or additional fields and/or data. Further, the fields and/or data illustrated in FIGS. 9A, 9B and 9C may be combined, divided, re-arranged, eliminated and/or implemented in any of a variety of ways. Moreover, the example data structures may include additional fields and/or data than those illustrated in FIGS. 9A, 9B and 9C and/or may include more than one of any or all of the illustrated fields and/or data. For example, the data structures may contain entries 905 for any number of call serving sites 115, 116 and/or call serving sites 115, 116 may appear any number of times. Moreover, each entry 920 need not contain the same number of entries 925.

FIGS. 10, 11A, 11B, 11C, 12A and 12B are flowcharts representative of example machine accessible instructions that may be executed to implement the example VoIP devices 105-108, and/or the example edge devices 125-128 of FIGS. 1-5. The example machine accessible instructions of FIGS. 10, 11A, 11B, 11C, 12A and/or 12B may be executed by a processor, a controller and/or any other suitable processing device. For example, the example machine accessible instructions of FIGS. 10, 11A, 11B, 11C, 12A and/or 12B may be embodied in coded instructions stored on a tangible medium such as a flash memory, a read-only memory (ROM) and/or random-access memory (RAM) associated with a processor (e.g., the example processor 1305 discussed below in connection with FIG. 13). Alternatively, some or all of the example flowcharts of FIGS. 10, 11A, 11B, 11C, 12A and/or 12B may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example flowcharts of FIGS. 10, 11A, 11B, 11C, 12A and/or 12B may be implemented manually or as any combination(s) of any of the foregoing techniques, for example, any combination of firmware, software, discrete logic and/or hardware. Further, although the example machine accessible instructions of FIGS. 10, 11A, 11B, 11C, 12A and 12B are described with reference to the flowcharts of FIGS. 10, 11A, 11B, 11C, 12A and 12B, persons of ordinary skill in the art will readily appreciate that many other methods of implementing the example VoIP devices 105-108, and/or the example edge devices 125-128 of FIGS. 1-5 may be employed. For example, the order of execution of the blocks may be changed, and/or some of the blocks described may be changed, eliminated, sub-divided, or combined. Additionally, persons of ordinary skill in the art will appreciate that any or all of the example machine accessible instructions of FIGS. 10, 11A, 11B, 11C, 12A and/or 12B may be carried out sequentially and/or carried out in parallel by, for example, separate processing threads, processors, devices, discrete logic, circuits, etc.

Figure 10:
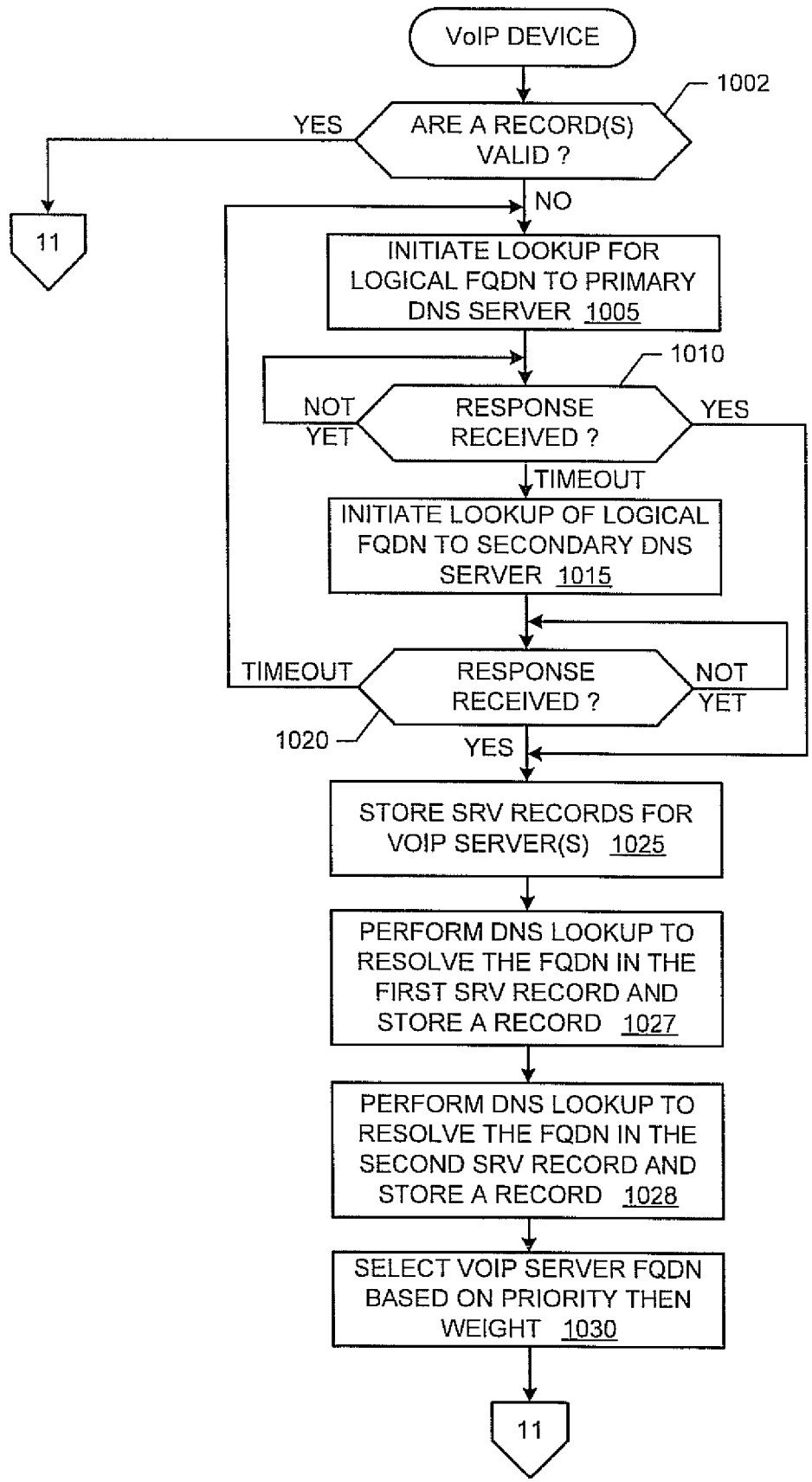
FIGS. 10, 11A, 11B and 11C are flowcharts representative of example machine readable instructions which may be executed to implement any or all of the example VoIP devices of FIG. 1.

The example machine readable instructions of FIG. 10 begin when, for example, a VoIP device (e.g., any of the example VoIP devices 105-108 of FIG. 1) is powered up and/or restarted. The example machine readable instructions of FIG. 10 may, alternatively and/or additionally, be executed whenever the VoIP device does not have a valid registration (e.g., when an edge device 125-127 and/or P-CSCF 210 to which the VoIP device is communicating is not longer available). The VoIP device determines if one or more valid A records are available and/or stored by the VoIP device (block 1002). If one or more valid A records are available (block 1002), the VoIP device attempts to register itself by, for example, executing the example machine accessible instructions of FIG. 11.

If no valid A records are available (block 1002), the VoIP device (e.g., a device selector such as the example device selector 155 of FIG. 1) performs a DNS lookup based upon a logical identifier (e.g., the example logical identifier 705 of FIG. 7) to a primary DNS server (block 1005). The device selector waits to receive a response from the primary DNS server (block 1010). If a response is received (block 1010), control proceeds to block 1025 to store the DNS SRV records received from the DNS server (block 1025).

The device selector performs a first DNS lookup to resolve the FQDN contained in the first DNS SRV record and stores the resulting A record (block 1027) and then performs a second DNS lookup to resolve the FQDN contained in the second DNS SRV record and stores the resulting A record (block 1028). The VoIP device then attempts to register the VoIP device by, for example, executing the example machine accessible instructions of FIG. 11A or 11C.

Returning to block 1010, if a response has not been received and timeout not occurred (block 1010), the device selector continues waiting (block 1010). If a timeout occurs while waiting for the response (block 1010), the device selector performs a DNS lookup for the logical identifier to a second DNS server (block 1015). The device selector waits to receive a response from the primary DNS server (block 1020). If a timeout occurs while waiting for the response (block 1020), control returns to block 1005 to re-attempt the DNS lookup via the primary DNS server. If a response is received (block 1020), control proceeds to block 1025 to store the DNS SRV records received from the DNS server (block 1025). If a response has not been received and timeout not occurred (block 1020), the device selector continues waiting (block 1020).

Figure 11A:
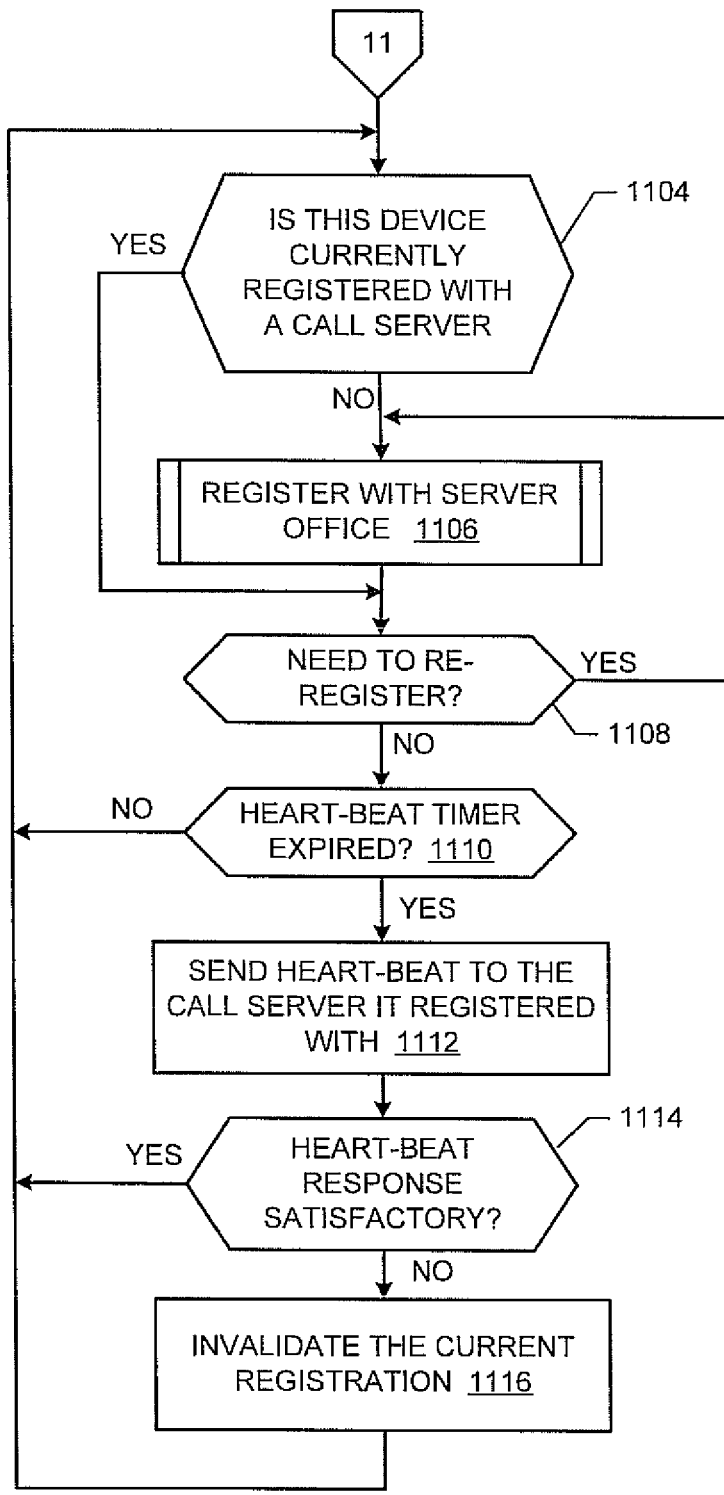

Continuing at block 1104 of FIG. 11A, the device selector determines if the VoIP device is currently registered (block 1104). If the VoIP device is not currently registered (block 1104), the VoIP device registers itself by, for example, executing the example machine accessible instructions of FIG. 11B (block 1106). If the VoIP device is currently registered (block 1104), control proceeds to block 1108 without registering the VoIP device.

At block 1108, the VoIP device determines if the VoIP device needs to re-register (block 1108). If the VoIP device needs to re-register (block 1108), control proceeds to block 1106 to re-register the VoIP device.

If the VoIP device does not need to re-register (block 1108), the device selector determines if its heart-beat timer has expired (block 1110). If its heart-beat timer has expired (block 1110), the device selector sends a heart-beat message to its call server (e.g., its P-CSCF 210) (block 1112). An example heart-beat message is a SIP OPTIONS message. If a satisfactory response is received to the heart-beat message (block 1114), control returns to block 1104 to determine if the VoIP device is currently registered. If a satisfactory response is not received (block 1114), the VoIP device invalidates its current registration (block 1116). Control then returns to block 1104 to determine if the VoIP device is currently registered.

Figure 11B:
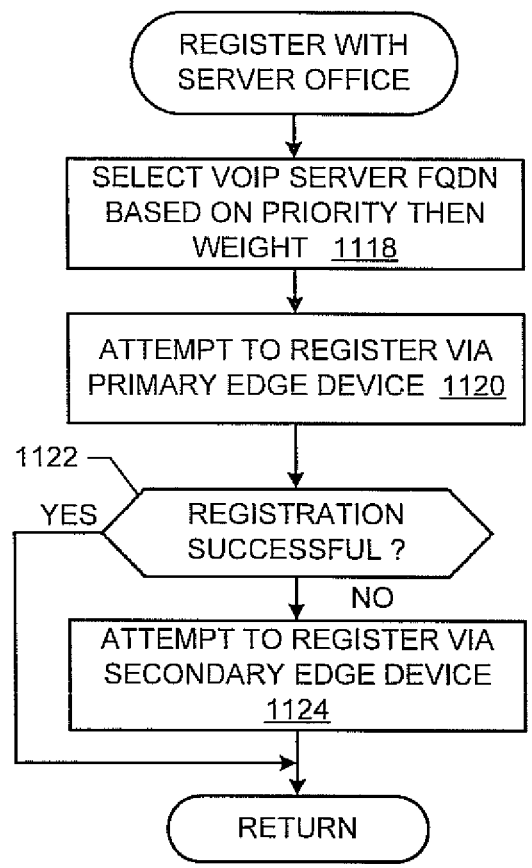

FIG. 11B illustrates example machine accessible instructions that may be executed to register a VoIP device (e.g., any of the example VoIP devices 105-108 of FIG. 1) with a call server (e.g., a P-CSCF 210). The example machine accessible instructions of FIG. 11B begin with the device selector selecting one of the FQDNs based upon either the priorities (e.g., the example priorities 825) and/or the weights (e.g., the example weights 830) assigned to the FQDN (block 1118). The VoIP device attempts to register with the VoIP network via the selected edge device (i.e., the primary edge device) (block 1120). In the illustrated example of FIG. 11B, the VoIP device attempts to resister to the VoIP network in accordance with IETF RFC 3261. If registration via the primary edge device is successful (e.g., a 200 OK response received) (block 1122), control returns from the example machine accessible instructions of FIG. 11B to, for example, the example machine accessible instructions of FIGS. 11A and/or 11C.

If registration via the primary edge device is not successful (block 1122), the VoIP device attempts to register with the VoIP network via the secondary edge device (block 1124). In the illustrated example of FIG. 11B, the VoIP device attempts to register to the VoIP network in accordance with IETF RFC 3261. When registration via the secondary edge device is completed, control returns from the example machine accessible instructions of FIG. 11B to, for example, the example machine accessible instructions of FIG. 11A and/or 11C.

Figure 11C:
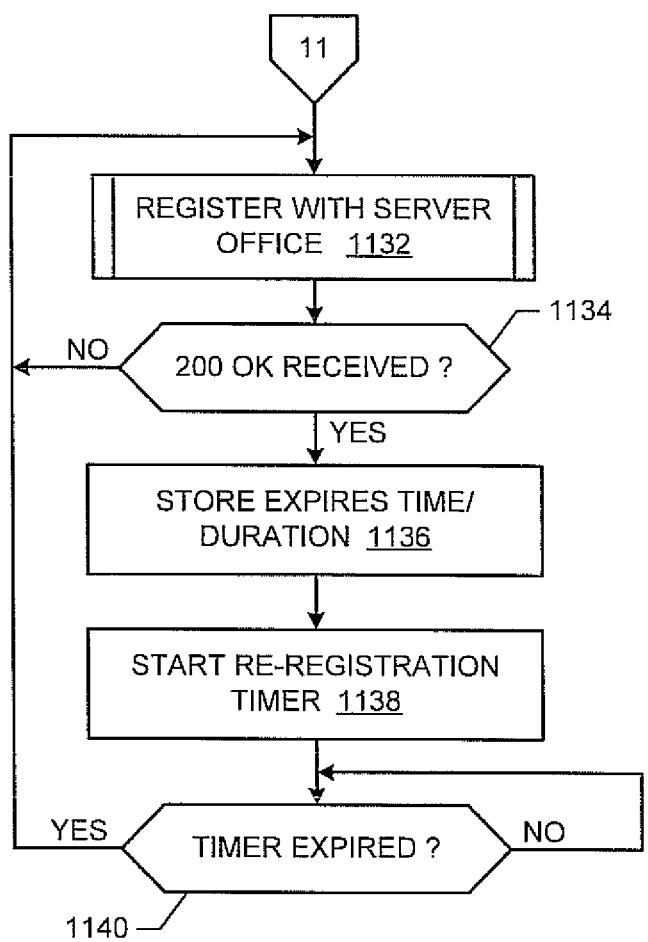

FIG. 11C is an example flowchart representative of machine accessible instructions that may be executed, for example, instead of the example machine accessible instructions of FIG. 11A. The example machine accessible instructions of FIG. 11C begin with VoIP device registering with a VoIP network by, for example, executing the example machine accessible instructions of FIG. 11B (block 1132).

If the registration is successful (e.g., a 200 OK response received) (block 1134), the VoIP device stores the registration expiration time and/or registration window duration (block 1136) and starts a re-registration timer based upon the registration window duration specified in the registration response message (e.g., fifteen minutes) (block 1138). In the example of FIG. 11C, if the registration window duration is less than 1200 seconds, the duration of the timer is set to one-half the registration window duration. If the registration window duration is greater than or equal to 1200 seconds, the duration of the timer is set to the registration window duration minus 600 seconds. When the timer expires (block 1140), control returns to block 1132 to re-register the VoIP device.

Figure 12A:
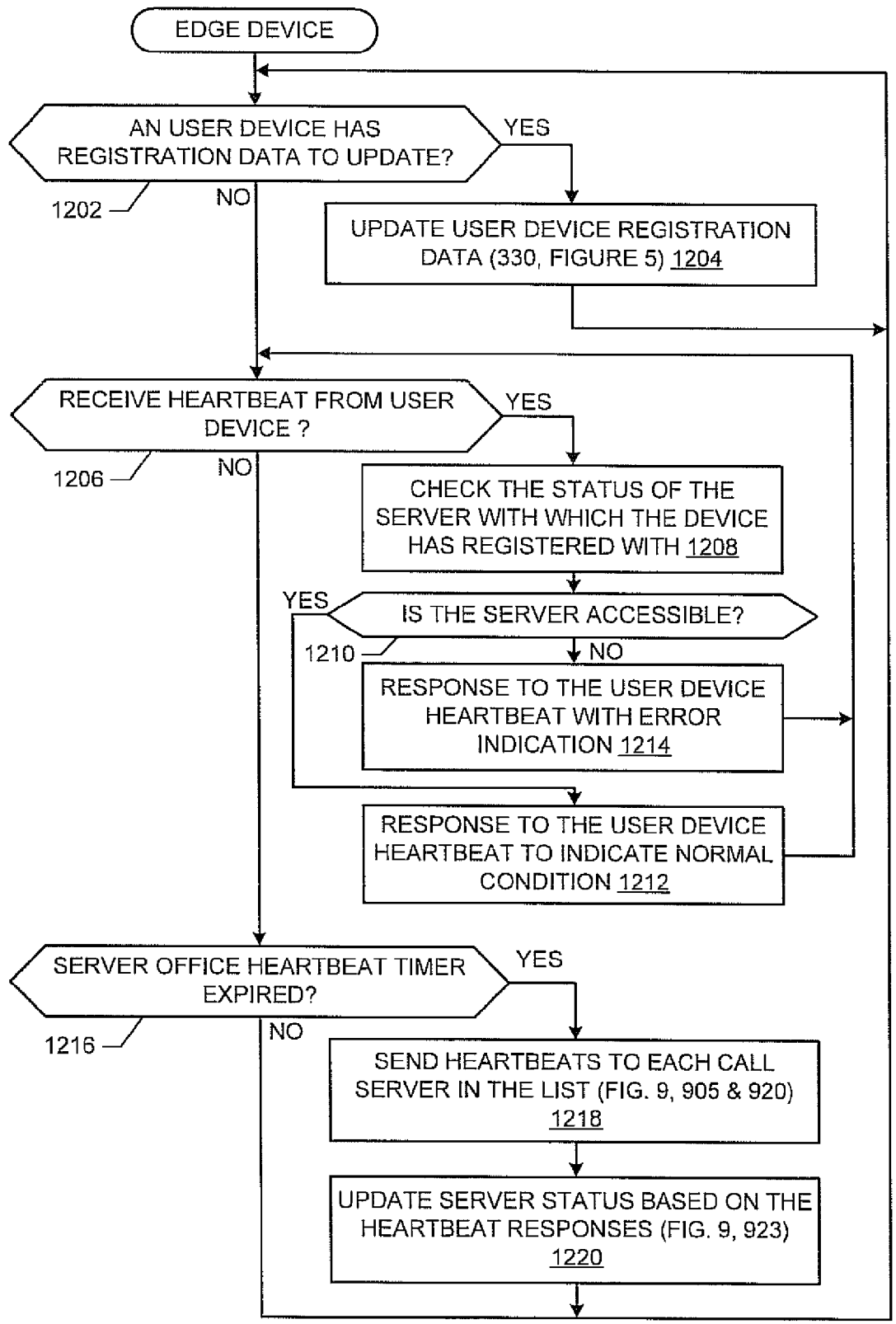
FIGS. 12A and 12B are flowcharts representative of example machine readable instructions which may be executed to implement any or all of the example edge devices of FIGS. 1 and 3.

The example machine accessible instructions of FIG. 12A may be executed by an edge device (e.g., any of the example edge devices 125-128 of FIG. 1) to implement heart-beat exchanges with VoIP devices (e.g., the example VoIP devices 105-108 of FIG. 1) to maintain a list of accessible VoIP devices, and heart-beat exchanges with P-CSCFs of call serving offices (e.g., any of the example P-CSCFs 210 or any of the example call serving offices 115, 116) to maintain a list of accessible call servers. The example machine accessible instructions of FIG. 12A begins when an edge device (e.g., any of the example edge devices 125-128) is initialized. The edge device determines if there is registration data for a user device (e.g., any of the VoIP devices 105-108) that needs to be updated (block 1202). For example, a VoIP device may have been registered such that the registration data (e.g., the example call server name field 515 of FIG. 5A) needs to be updated to specify the call server that registered the VoIP device. If registration data needs to be updated, the edge device updates the registration data for the VoIP device (block 1204). Control then returns to bock 1202 to determine if more registration data needs to be updated.

If registration data does not need to be updated (block 1202), the edge device determines if a heart-beat message was received from a VoIP device (block 1206). An example heart-beat message is a SIP OPTIONS message. If a heart-beat message was received from a VoIP device (block 1206), the edge device checks the status of the call server to which the VoIP device is registered (block 1208). For example, the edge device uses the example call server name field 515 of FIGS. 5A and/or 5B to identify the P-CSCF 210 that registered the VoIP device and then uses the server status field 923 of FIG. 9 to determine whether the P-CSCF 210 is accessible. If the call server is accessible (block 1208), the edge device responds to the VoIP device indicating its call server is still accessible (block 1212). Control then returns to block 1206 to determine if another heart-beat messages has been received from a VoIP device.

If the call server is no longer accessible (block 1208), the edge device responds to the VoIP device with an error respond that, for example, indicates to the VoIP device that its registration is no longer valid (block 1214). Control then returns to block 1206 to determine if another heart-beat message has been received from a VoIP device.

Returning to block 1206, if a heart-beat message was not received from a VoIP device (block 1206), the edge device determines if a heart-beat timer associated with a call server has expired (block 1216). If a call server heartbeat timer has not expired, control returns to block 1202 to check if a VoIP device has registration data that needs to be updated. If a call server heart-beat timer has expired (block 1216), the edge device sends a heart-beat message to the call server (block 1218). Additionally or alternatively, a heart-beat timer may be associated with more than one call server such that when the timer expires more than one heart-beat message to more than one call server is sent at block 1218. For example, the edge device sends a heart-beat message to each of the call servers specified by the example entries 905 and/or the example entries 920 of FIG. 9A. Based upon responses received for the heart-beat messages, the edge device updates the status of each of the call servers it sent a heart-beat message to (block 1220). For example, the edge device updates the example call server status field 923 of FIG. 9A. Control then returns to block 1202 to check if a VoIP device has registration data that needs to be updated.

Persons of ordinary skill in the art will readily appreciate that the example machine accessible instructions of FIG. 12A may be carried out sequentially and/or carried out in parallel by, for example, separate processing threads and/or sub-processes. For example, blocks 1202 and 1204 could be carried out by a first processing thread; blocks 1206, 1208, 1210, 1212 and 1214 could be carried out by a second processing thread; and blocks 1216, 1218 and 1220 could be carried out by a third processing thread.

Figure 12B:
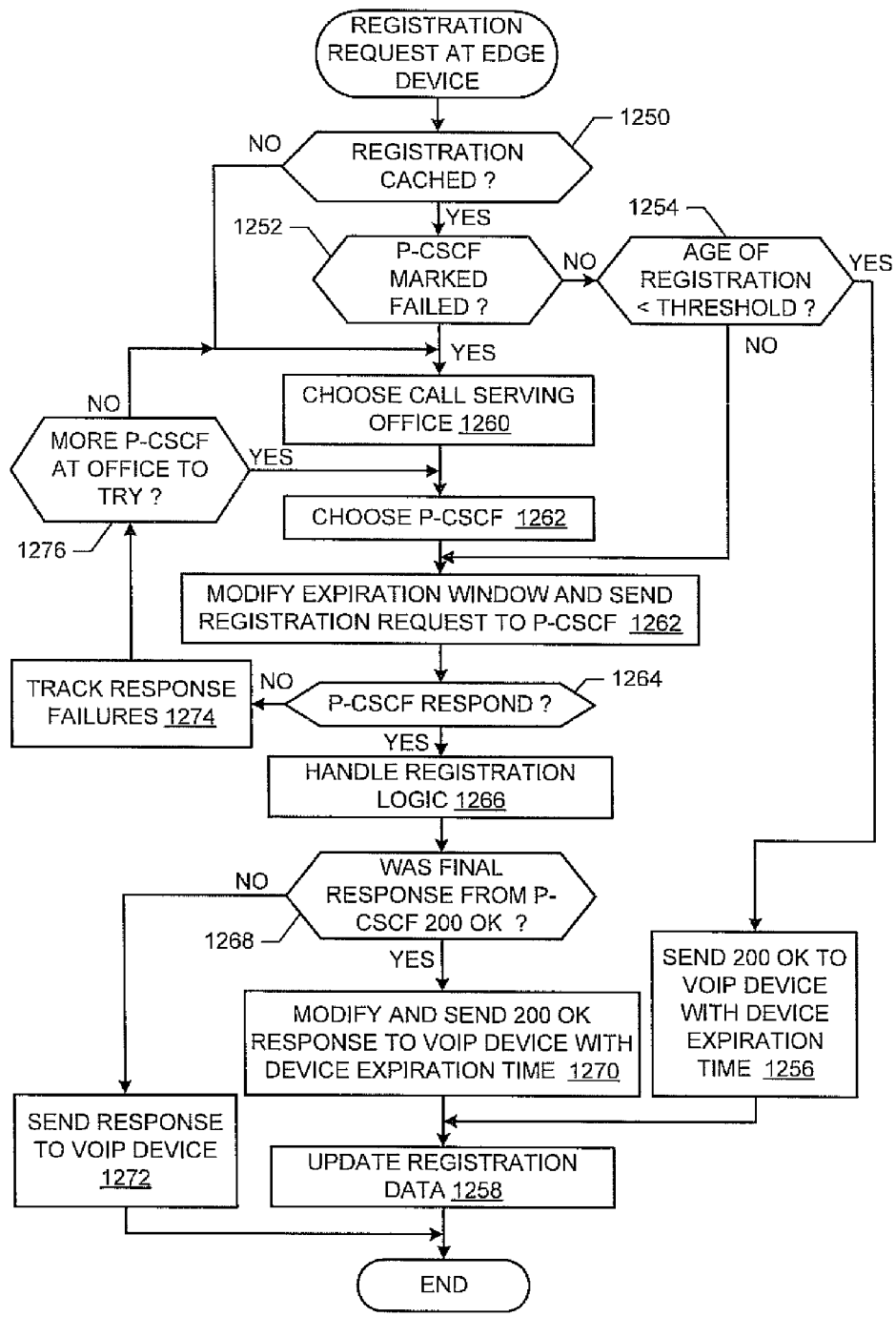

The example machine accessible instructions of FIG. 12B may be executed, for example, instead of the example machine accessible instructions of FIG. 12A, to implement registration caching at an edge device (e.g., any of the example edge devices 125-128 of FIG. 1) and to implement a more frequent heart-beat exchange with VoIP devices (e.g., the example VoIP devices 105-108 of FIG. 1) to maintain a valid registration state for the VoIP devices. The example machine accessible instructions of FIG. 12B also implement a less frequent heart-beat exchange with the P-CSCFs of call serving offices. The example machine accessible instructions of FIG. 12B begin when a registration request is received at the edge device from a VoIP device.

The edge device (e.g., the example SIP server logic 315 and/or the example VoIP device heartbeat handler 325 of FIG. 3) determines if the VoIP device has previously registered (e.g., a registration is stored in the example the example registration data 330 of FIGS. 3 and 5B) (block 1250). If a registration has been cached (block 1250), the edge device (e.g., the example server connectivity controller 340) determines if the P-CSCF to which the VoIP device is registered is marked as unavailable, down and/or failed (block 1252). If the P-CSCF is not marked as unavailable, down and/or failed (block 1252), the VoIP device heartbeat handler determines if the age of the registration is less than a threshold (block 1254). An example threshold used at block 1254 is substantially equal to a value stored in the example device registration window duration field 530 of FIG. 5B, such as one-half of the registration window duration of the registration (e.g., the value stored in the example P-CSCF re-registration window field 520 of FIG. 5B). If the age of the registration is less than threshold (block 1254), the VoIP device heartbeat handler sends a registration response (e.g., a SIP 200 OK message) to the VoIP device that specifies a shorter registration window (e.g., fifteen minutes and/or the value stored in the example device re-registration window duration 530) than that originally specified by the P-CSCF (e.g., twenty-four hours) (block 1256). The VoIP device heartbeat handler updates the registration data (e.g., the example fields 525 and 535 of FIG. 5B) (block 1258). Control then exits from the example machine accessible instructions of FIG. 12B.

Returning to block 1254, if the age of the registration is not less than the threshold (block 1254), control proceeds to block 1262 to send the registration request to the P-CSCF.

Returning to block 1252, if the P-CSCF is marked as unavailable, down and/or failed (block 1252), the server connectivity controller (e.g., the example server selector 405 of FIG. 4) selects a call serving office (e.g., one of the example call serving offices 115, 116 of FIG. 1) based upon, (or example, a policy such as the example policy 160 of FIGS. 1, 3, 9A, 9B and/or 9C (block 1260). The server selector then selects a P-CSCF (e.g., one of the example P-CSCFs 210 of FIG. 2) implemented by and/or at the selected call serving office based upon, for example, a policy such as the example policy 160 of FIGS. 1, 3, 9A, 9B and/or 9C (block 1262).

At block 1262, the SIP server logic modifies the registration request so that the request specifies a P-CSCF registration window (e.g., the value stored in the example P-CSCF re-registration window field 520 of FIG. 5B) and sends the registration request to the selected P-CSCF (block 1262) and the server connectivity controller (e.g., the example response monitor 405 of FIG. 4) waits for the P-CSCF to respond (block 1240). If a response is received from the P-CSCF (block 1264), the SIP server logic handles the remainder of the registration exchange (block 1266).

If the last response received from the P-CSCF is a 200 OK message (block 1268), the VoIP device heartbeat handler modifies the expires field (e.g., the example expires field 620 of FIG. 6) to specify a shorter registration window duration (e.g., fifteen minutes and/or the value stored in the example device re-registration window duration 530 of FIG. 5B), and the SIP server logic sends the modified registration response to the VoIP device (block 1270). The VoIP device heartbeat handler then updates the registration data (e.g., the example fields 525 and 535 of FIG. 5B) (block 1258). Control then exits from the example machine accessible instructions of FIG. 12B.

Returning to block 1268, if the last response received from the P-CSCF is not a 200 OK message (block 1268), the SIP server logic sends the response to the VoIP device (block 1272). Control then exits from the example machine accessible instructions of FIG. 12B.

Returning to block 1264, if the P-CSCF does not respond (block 1264), using any algorithm(s), method(s) and/or logic and using, for instance, the example entries 935 of FIGS. 9A, 9B and/or 9C, the server selector updates data used to tracking failing, unavailable and/or failed P-CSCFs and/or call serving offices (block 1274). For example, using the value stored in the example retry field 950, the server selector determines if a retry is to be attempted. If a retry is to be attempted, the server selector uses the value stored in the example field 955 to determine how long to wait between attempts. Further, when the number of retry attempts has been completed, the server selector uses the value stored in the example field 940 to determine how many such failed attempts are required to determined that a P-CSCF and/or call serving office is failed and/or unavailable. If there are more P-CSCFs to try at the selected call serving office (block 1276), control proceeds to block 1262 to select a different P-CSCF. If there are no more P-CSCFs to try at the selected call serving office or if the call serving office has been identified as failing and/or failed (block 1276), control returns to block 1260 to select a different call serving office.

Returning to block 1250, if the VoIP device has not been previously registered (block 1250), control proceeds to block 1260 to select a call serving office.

Figure 13:
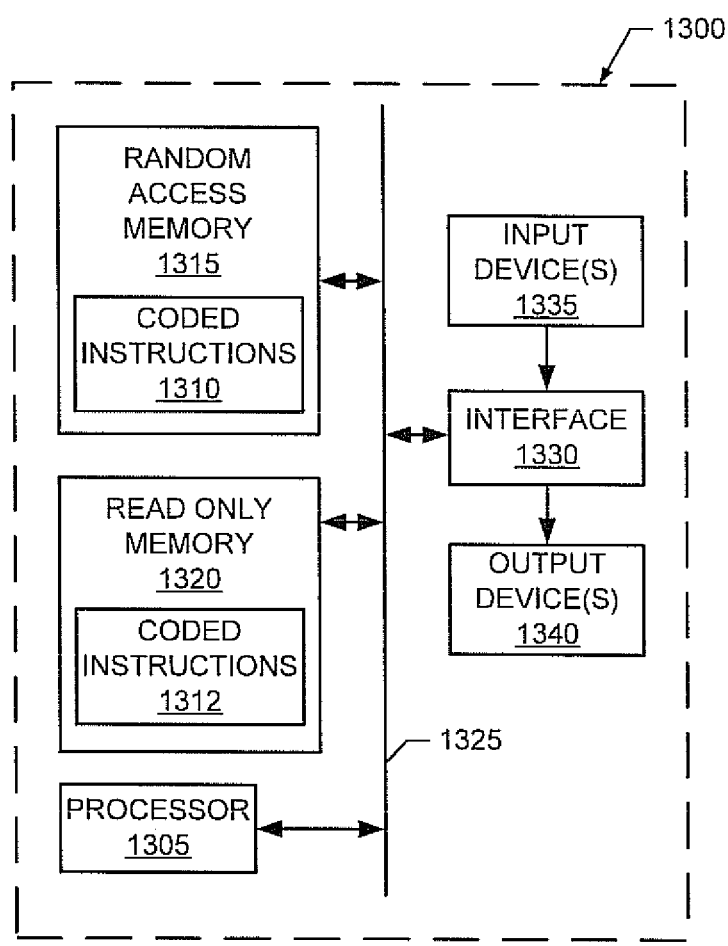
FIG. 13 is a schematic illustration of an example processor platform that may be used and/or programmed to execute the example machine readable instructions represented by FIGS. 10, 11A, 11B, 11C, 12A and/or 12B to implement any or all of the example VoIP devices, the example edge devices and/or the example call serving offices described herein.

FIG. 13 is a schematic diagram of an example processor platform 1300 that may be used and/or programmed to implement all or a portion of the example VoIP devices 105-108 and/or the example edge devices 125-128 of FIGS. 1-5. For example, the processor platform 1300 can be implemented by one or more general purpose processors, processor cores, microcontrollers, etc.

The processor platform 1300 of the example of FIG. 13 includes at least one general purpose programmable processor 1305. The processor 1305 executes coded instructions 1310 and/or 1312 present in main memory of the processor 1305 (e.g., within a RAM 1315 and/or a ROM 1320). The processor 1305 may be any type of processing unit, such as a processor core, a processor and/or a microcontroller. The processor 1305 may execute, among other things, the example machine accessible instructions of FIGS. 10, 11A, 11B, 11C, 12A and/or 12B to provide fault tolerance for a VoIP communication system. The processor 1305 is in communication with the main memory (including a ROM 1320 and/or the RAM 1315) via a bus 1325. The RAM 1315 may be implemented by DRAM, SDRAM, and/or any other type of RAM device, and ROM may be implemented by flash memory and/or any other desired type of memory device. Access to the memory 1315 and 1320 maybe controlled by a memory controller (not shown). The RAM 1315 may be used to store and/or implement, for example, the example DNS SRV records 130, the example data 150, the example policies 160, the example registration data 330, and/or the example data structures of FIGS. 5-9, 9A and/or 9B.

The processor platform 1300 also includes an interface circuit 1330. The interface circuit 1330 may be implemented by any type of interface standard, such as an external memory interface, serial port, general purpose input/output, etc. One or more input devices 1335 and one or more output devices 1340 are connected to the interface circuit 1330. The input devices 1335 and/or output devices 1340 may be used to, for example, the network interface 310 of FIG. 3, interfaces between the example VoIP devices 105-108 and the IP network 130, and/or interfaces between any or all of the example servers 205, 210, 215, 220, 225, 240 and/or 245 of FIG. 2.

Of course, persons of ordinary skill in the art will recognize that the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, persons of ordinary skill in the art will readily appreciate that the above described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories; or a signal containing computer instructions. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

To the extent the above specification describes example components and functions with reference to particular devices, standards and/or protocols, it is understood that the teachings of the invention are not limited to such devices, standards and/or protocols. Such systems are periodically superseded by faster or more efficient systems having the same general purpose. Accordingly, replacement devices, standards and/or protocols halving the same general functions are equivalents which are intended to be included within the scope of the accompanying claims.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
   receiving a registration request at an edge device of a voice over Internet protocol system from a user device;
   selecting at the edge device a communication service providing device from a list of devices which provide communication services;
   sending the registration request to the selected communication service providing device;
   receiving at the edge device a first registration response from the selected communication service providing device;
   modifying a registration window field of the first registration response at the edge device to a second value shorter than a received value to cause the user device to re-register within a time period based on the second value;
   sending a modified first registration response from the edge device to the user device;
   modifying at the edge device a database entry to associate the user device with the communication service providing device when the first registration response indicates a successful registration;
   comparing an age of the first registration response to a threshold; and
   sending from the edge device a second registration response to the user device in response to a re-registration request and based on a result of the comparison.

2. A method as defined in claim 1, further comprising selecting a server office from a list of server offices, the server office implementing the devices which provide the communication services.

3. A method as defined in claim 2, wherein selecting the server office from a list of server offices comprises:
  selecting a first server office when at least one of the devices which provide the communication services is responsive to the registration request; and
  selecting a second server office when none of the devices which provide the communication services are responsive.

4. A method as defined in claim 1, further comprising:
  exchanging a heartbeat message with the communication service providing device to determine if the communication service providing device is available; and
  modifying a field of the database entry if the communication service providing device is out-of-service.

5. A method as defined in claim 4, wherein the heartbeat message comprises a session initiation protocol OPTIONS message.

6. A method as defined in claim 4, further comprising notifying the user device that the communication service providing device is not available.

7. A method as defined in claim 1, further comprising:
  receiving a heartbeat message from the user device at the edge device;
  determining if the communication service providing device is accessible;
  sending an error indication to the user device when the communication service providing device is not accessible; and
  sending a normal condition indication to the user device when the communication service providing device is accessible.

8. A method as defined in claim 1, further comprising;
  sending a heartbeat message to the communication service providing device;
  identifying the communication service providing device as accessible when a positive response is received; and
  identifying the communication service providing device as inaccessible when a negative response is received.

9. A method as defined in claim 8, wherein the heartbeat message comprises a session initiation protocol OPTIONS message.

10. A method as defined in claim 1, further comprising:
  exchanging a first heartbeat message with the user device based upon a first interval timer that allows the user device to determine if the edge device is accessible; and
  exchanging a second heartbeat message with the communication service providing device based upon a second interval timer to determine if the communication service providing device is accessible.

11. A method as defined in claim 10, wherein the first interval timer is independent of the second interval timer.

12. An edge device of a voice over Internet protocol system comprising:
  a processor; and
  a memory comprising machine readable instructions which, when executed, cause the processor to at least:
  receive a registration request from a user device;
  select a call session control function server from a list of servers;
  send the registration request to the selected call session control function server based upon availabilities of the servers;
  receive a first registration response from the selected call session control function server;
  modify a registration window field of the first registration response to a second value shorter than a received value to cause the user device to re-register within a time period based on the second value;
  send a modified first registration response to the user device;
  compare an age of the first registration response to a threshold;
  send a second registration response to the user device in response to a re-registration request and based on a result of the comparison; and
  modify a database entry to associate the user device with the selected call session control function server providing device when the first registration response indicates a successful registration.

13. An edge device as defined in claim 12, wherein the instructions are to cause the processor to perform a domain name service lookup to obtain an address of the selected call session control function server; and
  send the registration request to the selected call session control function server based on the obtained address.

14. An edge device as defined in claim 12, wherein the instructions are further to cause the processor to select a server office from a list of server offices and select the selected call session control function server from in-service servers implemented at the server office.

15. An edge device as defined in claim 14, wherein instructions are to cause the processor to select the server office from the list of server offices by:
  selecting a first server office when a server implemented at the first server office is responsive to the registration request; and
  selecting a second server office when none of the servers are responsive.

16. An edge device as defined in claim 14, further comprising a timer, the instructions to cause the processor to:
  send a heartbeat message to the selected call session control function server when the timer expires; and
  determine an accessibility of the selected call session control function server based upon a response to the heartbeat message received from the selected call session control function server.

17. An edge device as defined in claim 16, wherein the heartbeat message comprises a session initiation protocol OPTIONS message.

18. An edge device as defined in claim 12, wherein the memory further stores registration data identifying to which call session control function server the user device is registered.

19. An edge device as defined in claim 12, wherein the edge device comprises a session border controller.

20. A tangible machine readable storage device comprising machine readable instructions which, when executed, cause a machine to at least:
  select, at an edge device of a voice over Internet protocol system, a communication service providing device from a list of devices able to provide communication services;
  send, from the edge device, a registration request received from a user device to the selected communication service providing device;
  modify, at the edge device, a registration window field of a first received registration response to a second value shorter than a received value to cause the user device to re-register within a time period based on the second value;
  send, from the edge device, a modified first registration response to the user device;
  modify at the edge device a database entry to associate the user device with the communication service providing device when a first registration response received at the edge device from the selected communication service providing device indicates a successful registration;

compare an age of the first registration response to a threshold; and send from the edge device a second registration response to the user device in response to a re-registration request and based on a result of the comparison.

21. A storage device as defined in claim 20, wherein the machine readable instructions, when executed, cause the machine to select a server office from a list of in-service server offices, the server office implementing the devices to provide the communication services.

22. A storage device as defined in claim 20, wherein the machine readable instructions, when executed, cause the machine to: exchange a heartbeat message with the communication service providing device to determine if the communication service providing device is available; and modify a field of the database entry if the communication service providing device is out-of-service.

23. A storage device as defined in claim 20, wherein the machine readable instructions, when executed, cause the machine to: receive a heartbeat message from the user device; determine whether the communication service providing device is accessible; send an error indication to the user device when the communication service providing device is not accessible; and send a normal condition indication to the user device when the communication service providing device is accessible.

24. A storage device as defined in claim 20, wherein the machine readable instructions, when executed, cause the machine to: send a heartbeat message to the communication service providing device; identify that the communication service providing device is accessible if a positive response is received; and identify that the communication service providing device is inaccessible if a negative response is received.

25. A storage device as defined in claim 20, wherein the machine readable instructions, when executed, cause the machine to: exchange a first heartbeat message with the user device based upon a first interval timer that allows the user device to determine if the edge device is accessible; and exchange a second heartbeat message with the communication service providing device based upon a second interval timer to determine if the communication service providing device is accessible.

26. A storage device as defined in claim 25, wherein the first interval timer is independent of the second interval timer.

27. A storage device as defined in claim 25, wherein the user device initiates an exchange of the first heartbeat message based upon the first interval timer.

28. A storage device as defined in claim 20, wherein the machine readable instructions, when executed, cause the machine to send the first registration response to the user device.

29. A method as defined in claim 1, wherein sending the second registration response is performed without sending a second registration request from the edge device to the communication service providing device when the age of the first registration response is less than the threshold.

* * * * *